(12) United States Patent
Maeyama

(10) Patent No.: US 11,313,593 B2
(45) Date of Patent: Apr. 26, 2022

(54) COMPRESSOR AND REFRIGERATION CYCLE APPARATUS

(71) Applicant: Mitsubishi Electric Corporation, Tokyo (JP)

(72) Inventor: Hideaki Maeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/560,407

(22) PCT Filed: May 27, 2015

(86) PCT No.: PCT/JP2015/065253
§ 371 (c)(1),
(2) Date: Sep. 21, 2017

(87) PCT Pub. No.: WO2016/189698
PCT Pub. Date: Dec. 1, 2016

(65) Prior Publication Data
US 2018/0066873 A1    Mar. 8, 2018

(51) Int. Cl.
*F25B 9/00* (2006.01)
*F04C 18/344* (2006.01)
(Continued)

(52) U.S. Cl.
CPC .............. *F25B 9/002* (2013.01); *C09K 5/045* (2013.01); *F04C 18/344* (2013.01);
(Continued)

(58) Field of Classification Search
CPC .......... F25B 9/002; F25B 13/00; F25B 1/053; F25B 1/02; F25B 1/04; C09K 5/045;
(Continued)

(56) References Cited

U.S. PATENT DOCUMENTS 1,797,385 A * 3/1931 Weissenburger ..... F25B 41/315
 62/192
2,183,343 A * 12/1939 Alsing .................... F25B 41/37
 62/117
(Continued)

FOREIGN PATENT DOCUMENTS

CN         102472282 A      5/2012
CN         204027110 U      12/2014
(Continued)

OTHER PUBLICATIONS

Office Action dated Feb. 6, 2018 issued in corresponding JP patent application No. 2017-520160 (and English translation thereof).
(Continued)

*Primary Examiner* — Eric S Ruppert
*Assistant Examiner* — Kirstin U Oswald
(74) *Attorney, Agent, or Firm* — Posz Law Group, PLC

(57) ABSTRACT

A compressor 12 for use in a refrigerant circuit 11 using a refrigerating machine oil 60 being free of phosphoric ester and a refrigerant mixture inclusive of 1,1,2-trifluoroetylene includes a rolling piston 32 and a vane 33 in contact with the rolling piston 32 in a slidable manner. The rolling piston 32 and the vane 33 are formed of a base metal, the base metal being steel, and the base metal is exposed at a contact portion between the rolling piston 32 and the vane 33.

9 Claims, 7 Drawing Sheets

(51) Int. Cl.
F25B 1/02 (2006.01)
F04C 29/04 (2006.01)
F25B 1/053 (2006.01)
F25B 1/04 (2006.01)
F04C 23/00 (2006.01)
F25B 13/00 (2006.01)
F04C 25/00 (2006.01)
F04C 18/356 (2006.01)
C09K 5/04 (2006.01)
F04C 28/28 (2006.01)

(52) U.S. Cl.
CPC .......... *F04C 18/356* (2013.01); *F04C 23/008* (2013.01); *F04C 25/00* (2013.01); *F04C 29/042* (2013.01); *F25B 1/02* (2013.01); *F25B 1/04* (2013.01); *F25B 1/053* (2013.01); *F25B 13/00* (2013.01); C09K 2205/126 (2013.01); C09K 2205/24 (2013.01); F04C 28/28 (2013.01); F04C 2210/263 (2013.01); F04C 2210/268 (2013.01); F04C 2280/00 (2013.01)

(58) Field of Classification Search
CPC .......... C09K 2205/24; C09K 2205/126; F04C 25/00; F04C 18/356; F04C 23/008; F04C 29/042; F04C 18/344; F04C 28/28; F04C 2280/00; F04C 2210/268; F04C 2210/263; F04C 29/04
USPC .......................................................... 62/498
See application file for complete search history.

(56) References Cited

U.S. PATENT DOCUMENTS

| | | | | |
|---|---|---|---|---|
| 2,192,849 A * | 3/1940 | Tobey | ................... | F25B 49/025 62/214 |
| 2,260,608 A * | 10/1941 | Cormack | .............. | F25B 43/003 62/85 |
| 2,270,087 A * | 1/1942 | Shoemaker | ............. | F25B 41/30 62/218 |
| 2,509,609 A * | 5/1950 | Philipp | ................. | F25D 23/006 62/456 |
| 3,371,501 A * | 3/1968 | Rhea | ....................... | F25B 13/00 62/160 |
| 4,208,886 A * | 6/1980 | Maudlin | ................. | F25B 41/20 62/498 |
| 5,355,695 A * | 10/1994 | Kawaguchi | ........ | C10M 171/008 62/114 |
| 5,531,080 A * | 7/1996 | Hirahara | ................ | C09K 5/045 62/470 |
| 5,951,273 A * | 9/1999 | Matsunaga | ......... | F01C 21/0809 418/63 |
| 6,189,322 B1 * | 2/2001 | Ishihara | ................. | C09K 5/041 62/114 |
| 6,598,422 B1 * | 7/2003 | Smith | ..................... | F25B 41/00 62/509 |
| 2001/0037649 A1 * | 11/2001 | Fujitaka | ................. | F25B 41/40 62/114 |
| 2005/0011215 A1 * | 1/2005 | Gu | ......................... | F25B 41/30 62/324.1 |
| 2005/0284169 A1 * | 12/2005 | Tamura | ................... | F25B 41/00 62/324.1 |
| 2010/0050668 A1 | 3/2010 | Bush et al. | | |
| 2010/0192623 A1 * | 8/2010 | Cittadini | ............... | F28F 9/0246 62/498 |
| 2012/0128519 A1 | 5/2012 | Nakano et al. | | |
| 2014/0070132 A1 * | 3/2014 | Fukushima | ............. | F25B 9/002 252/67 |
| 2014/0314606 A1 | 10/2014 | Maeyama et al. | | |
| 2015/0204587 A1 * | 7/2015 | Park | ...................... | F25B 31/026 62/498 |
| 2015/0300698 A1 | 10/2015 | Tanaka et al. | | |

FOREIGN PATENT DOCUMENTS

| | | |
|---|---|---|
| CN | 204165293 U | 2/2015 |
| EP | 2562490 A1 | 2/2013 |
| EP | 3 012 555 A1 | 4/2016 |
| EP | 3 012 556 A1 | 4/2016 |
| EP | 3012555 A1 | 4/2016 |
| EP | 3012556 A1 | 4/2016 |
| EP | 3 208 554 A1 | 8/2017 |
| EP | 3 208 555 A1 | 8/2017 |
| JP | H10-9714 A | 1/1998 |
| JP | 2002-195700 A | 7/2002 |
| JP | 2007-263402 A | 10/2007 |
| JP | 2008-122034 A | 5/2008 |
| JP | 2009-263666 A | 11/2009 |
| JP | 2010-520985 A | 6/2010 |
| JP | 2011-226729 A | 11/2011 |
| JP | 2014-077143 A | 5/2014 |
| JP | 2014-211092 A | 11/2014 |
| KR | 20110023764 A | 3/2011 |
| WO | 2012/157764 A1 | 11/2012 |
| WO | 2014/069603 A1 | 5/2014 |
| WO | 2014/203355 A1 | 12/2014 |
| WO | 2014/203356 A1 | 12/2014 |

OTHER PUBLICATIONS

International Search Report of the International Searching Authority dated Aug. 18, 2015 for the corresponding International application No. PCT/JP2015/065253 (and English translation).
Office action dated Oct. 15, 2018 issued in corresponding AU patent application No. 2015396402.
Office action dated Oct. 25, 2018 issued in corresponding KR patent application No. 10-2017-7033466 (and English translation thereof).
Office action dated Sep. 3, 2018 issued in corresponding CN patent application No. 201580080198.1 (and English translation thereof).
Office Action dated Apr. 26, 2019 issued in corresponding CN patent application No. 201580080198.1 (and English translation).
Office action dated Oct. 2, 2018 issued in corresponding JP patent application No. 2017-520160 (and English translation thereof).
Extended EP Search Report dated Mar. 19, 2019 issued in corresponding EP patent application No. 15893332.5.
Air Conditioning Technology and Equipment, Nov. 30, 1987, Posts & Telecom Press Co., LTD. (and English translation).
Home Refrigerator Users Must Read, Aug. 31, 1985, Zhejiang Science and Technology Press Co., Ltd. (and English translation).
Office Action dated Nov. 22, 2019 issued in corresponding CN patent application No. 201580080198.1 (and English translation).
Air Conditioning Technology and Equipment, Nov. 30, 1987.
Home Refrigerator Users Must Read, Aug. 31, 1985.
Office Action dated Feb. 25, 2020 issued in corresponding EP patent application No. 15893332.5.
Office Action dated Sep. 18, 2020 issued in corresponding IN patent application No. 201747035703.
Office Action dated Sep. 30, 2020 issued in corresponding EP patent application No. 15 893 332.5.

* cited by examiner

COMPRESSOR AND REFRIGERATION CYCLE APPARATUS

CROSS REFERENCE TO RELATED APPLICATION

This application is a U.S. national stage application of International Application No. PCT/JP2015/065253, filed on May 27, 2015, the contents of which are incorporated herein by reference.

TECHNICAL FIELD

The present invention relates to a compressor and a refrigeration cycle apparatus and more particularly to a compressor and a refrigeration cycle apparatus utilizing a refrigerant mixture inclusive of 1,1,2-trifluoroetylene.

BACKGROUND

In recent years, from the viewpoint of global warming mitigation, there has been a demand for greenhouse gas reduction. For refrigerants for use in refrigeration cycle apparatuses, such as air-conditioning apparatuses, refrigerants with lower global warming potential (GWP) are under study. R410A widely used for air-conditioning apparatuses has an extremely high GWP of 2088. Difluoromethane (R32), which is beginning to be used, also has a considerably high GWP of 675.

Examples of refrigerants with low GWP include carbon dioxide (R744: GWP=1), ammonia (R717: GWP=0), propane (R290: GWP=6), 2,3,3,3-tetrafluoropropene (HFO-1234yf: GWP=4), and 1,3,3,3-tetrafluoropropene (R1234ze: GWP=6).

These low-GWP refrigerants are difficult to use in air-conditioning apparatuses due to the following problems.

R744: Due to very high operating pressure, pressure resistance is required. Furthermore, due to its low critical temperature of 31 degrees C., it is difficult to ensure the performance of air-conditioning apparatuses.

R717: Due to its high toxicity, safety must be ensured.

R290: Due to its high flammability, safety must be ensured.

HFO-1234yf/R1234ze: A high volume flow rate at low operating pressures results in an increased pressure loss and performance degradation.

A refrigerant that can overcome these problems is a refrigerant mixture inclusive of 1,1,2-trifluoroethylene (hereinafter referred to as HFO-1123) (see Patent Literature 1, for example). In particular, HFO-1123 has the following advantages.

A small volume flow rate at high operating pressures results in a small pressure loss and easily ensures the performance.

Having GWP of less than 1, the refrigerant is an advantageous measure against global warming.

PATENT LITERATURE

Patent Literature 1: International Publication No. WO 2012/157764

A decomposition product of HFO-1123 can react with an additive (such as an anti-wear agent) of refrigerating machine oil and produces sludge. In particular, HFO-1123 has a very short atmospheric lifetime of 1.6 days. Thus, a refrigerant mixture inclusive of HFO-1123 in a refrigeration cycle apparatus produces more sludge than refrigerants free of HFO-1123, and the sludge clogs a refrigerant circuit of the refrigeration cycle apparatus.

SUMMARY

The present invention has been made to overcome such problems and aims to provide a compressor that can prevent a refrigerant circuit from being clogged with sludge when used in a refrigeration cycle apparatus using a refrigerant mixture inclusive of HFO-1123, and a refrigeration cycle apparatus including the compressor.

A compressor according to an embodiment of the present invention is a compressor for use in a refrigerant circuit using a refrigerating machine oil being free of phosphoric ester and a refrigerant mixture inclusive of 1,1,2-trifluoroetylene, the compressor including: a first member formed of a base metal, the base metal being steel, the first member including a first contact portion; and a second member including a second contact portion being in contact with the first contact portion of the first member in a slidable manner, wherein the base metal of the first member is exposed at the first contact portion.

When a compressor according to an embodiment of the present invention is used in a refrigeration cycle apparatus using a refrigerant mixture inclusive of HFO-1123, fluoride ions produced by the decomposition of HFO-1123 react with an iron (Fe) component and form iron fluoride on the first contact portion (slide portion) of the first member. With no addition to refrigerating machine oil of phosphoric esters that are reactive to HFO-1123, iron fluoride is produced on the first contact portion (slide portion) of the first member in such an amount that the first member and the second member do not seize up. Thus, fluoride ions produced by the decomposition of HFO-1123 can be continuously consumed on the first contact portion (slide portion) of the first member in a compressor according to an embodiment of the present invention. Thus, a compressor according to an embodiment of the present invention can reduce sludge production in a refrigerant circuit. A compressor according to an embodiment of the present invention also has the effect of reducing sludge production due to no chemical reaction between fluoride ions and a phosphoric ester. Thus, a compressor according to an embodiment of the present invention can prevent a refrigerant circuit from being clogged with sludge.

DETAILED DESCRIPTION

Embodiment 1

Figure 1:
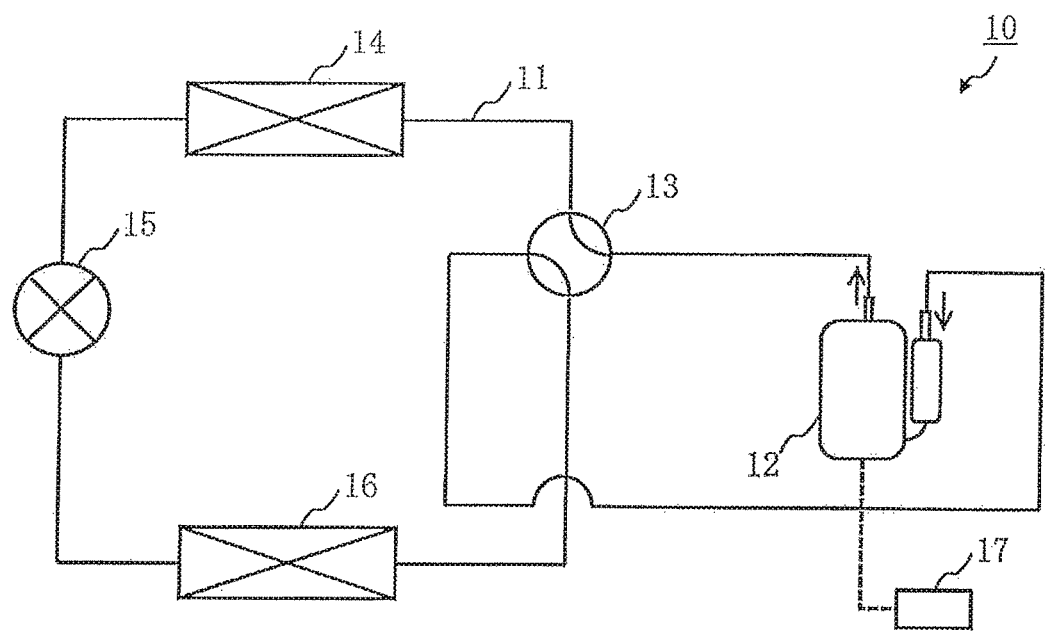
FIG. 1 is a circuit diagram of a refrigeration cycle apparatus 10 according to Embodiment 1 of the present invention (during cooling).
Figure 2:
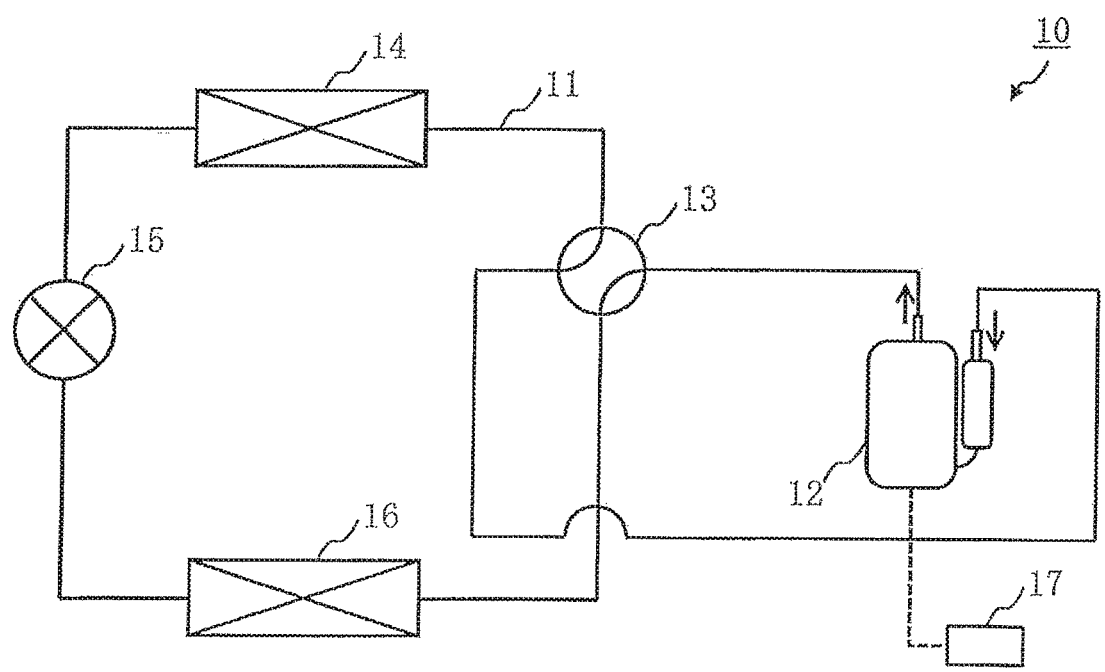
FIG. 2 is a circuit diagram of the refrigeration cycle apparatus 10 according to Embodiment 1 of the present invention (during heating).

FIGS. 1 and 2 are circuit diagrams of a refrigeration cycle apparatus 10 according to Embodiment 1 of the present invention. In other words, FIGS. 1 and 2 are circuit diagrams of the refrigeration cycle apparatus 10 including a compressor 12 according to Embodiment 1 of the present invention. FIG. 1 is a circuit diagram of the refrigeration cycle apparatus 10 during cooling. FIG. 2 is a circuit diagram of the refrigeration cycle apparatus 10 during heating.

In Embodiment 1, the refrigeration cycle apparatus 10 is an air conditioner. Even if the refrigeration cycle apparatus 10 is an apparatus other than air-conditioning apparatuses (for example, a heat pump cycle device), Embodiment 1 can be applied to the apparatus.

In FIGS. 1 and 2, the refrigeration cycle apparatus 10 includes a refrigerant circuit 11 through which a refrigerant circulates.

The refrigerant circuit 11 is coupled to the compressor 12, a four-way valve 13, which is a flow switching device, an outdoor heat exchanger 14, an expansion valve 15, which is an expansion mechanism, and an indoor heat exchanger 16. The compressor 12 compresses refrigerant. The four-way valve 13 switches the flow direction of refrigerant between cooling and heating. During cooling, the outdoor heat exchanger 14 serves as a condenser and dissipates heat from refrigerant compressed by the compressor 12. During heating, the outdoor heat exchanger 14 serves as an evaporator, exchanges heat between outdoor air and refrigerant expanded by the expansion valve 15, and thereby heats the refrigerant. The expansion valve 15 is an example of the expansion mechanism. The expansion valve 15 expands refrigerant from which heat has been rejected by the condenser. During heating, the indoor heat exchanger 16 serves as a condenser and dissipates heat from refrigerant compressed by the compressor 12. During cooling, the indoor heat exchanger 16 serves as an evaporator, exchanges heat between indoor air and refrigerant expanded by the expansion valve 15, and thereby heats the refrigerant. When the refrigeration cycle apparatus 10 is used for cooling or heating alone, the four-way valve 13 is not necessary.

The refrigeration cycle apparatus 10 further includes a controller 17.

The controller 17 is a microcomputer, for example. Although the controller 17 is connected to the compressor 12 alone in the figures, the controller 17 is connected to each element connected to the refrigerant circuit 11 as well as the compressor 12. The controller 17 monitors and controls the state of each element.

In Embodiment 1, the refrigerant circulating through the refrigerant circuit 11 (in other words, refrigerant used in the refrigerant circuit 11) is a refrigerant mixture inclusive of 1,1,2-trifluoroethylene (hereinafter referred to as HFO-1123). More specifically, in Embodiment 1, the refrigerant used in the refrigerant circuit 11 is a refrigerant mixture of HFO-1123 and a refrigerant other than HFO-1123.

A refrigerant mixture of HFO-1123 and difluoromethane (R32) can be used as a suitable refrigerant. Another refrigerant other than R32 may be used, for example, 2,3,3,3-tetrafluoropropene (HFO-1234yf), trans-1,3,3,3-tetrafluoropropene (R1234ze (E)), cis-1,3,3,3-tetrafluoropropene (R1234ze (Z)), 1,1,1,2-tetrafluoroethane (R134a), and/or 1,1,1,2,2-pentafluoroethane (R125).

In the refrigeration cycle apparatus 10 according to Embodiment 1, the refrigerant circuit 11 uses the refrigerating machine oil 60. The refrigerating machine oil 60 lubricates a slide portion of the compressor 12. The refrigerating machine oil 60 is mostly stored at the bottom of an airtight container of the compressor 12, as described later.

In Embodiment 1, no phosphoric ester is added to the refrigerating machine oil 60. Phosphoric esters are generally added to refrigerating machine oil as anti-wear agents. Thus, when an anti-wear agent is added to the refrigerating machine oil 60, the anti-wear agent is preferably free of phosphoric esters (for example, a sulfur-based anti-wear agent). An antioxidant (such as an amine-based antioxidant) and an acid scavenger (an epoxy-based acid scavenger) may be added to the refrigerating machine oil 60.

In Embodiment 1, the refrigerating machine oil 60 has a saturated water content of 1000 wt ppm (0.1% by weight) or more. The refrigerating machine oil with a saturated water content of 1000 wt ppm or more may be a polyol ester, poly(vinyl ether), or poly(alkylene glycol).

Figure 3:
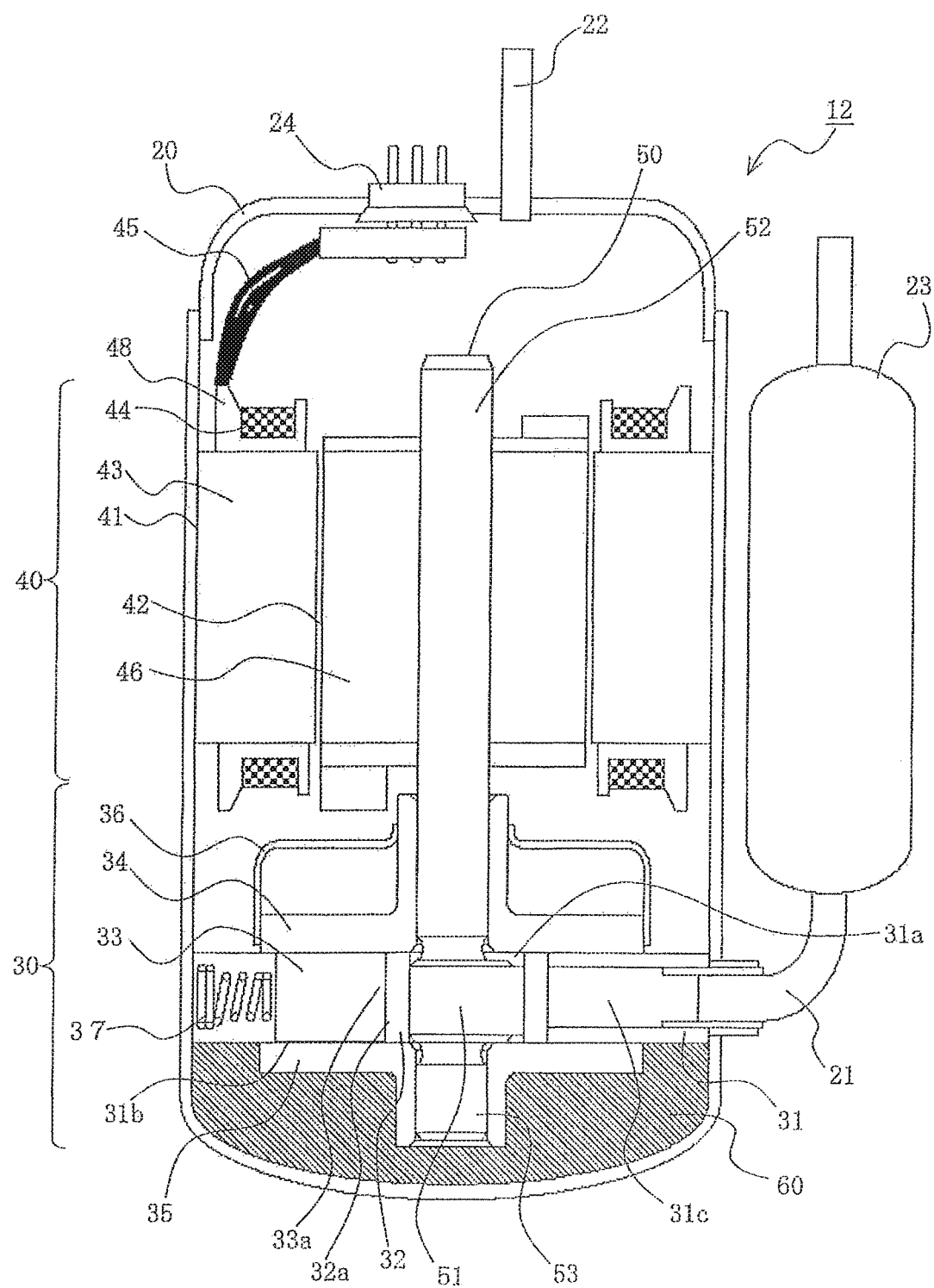
FIG. 3 is a longitudinal sectional view of a compressor 12 according to Embodiment 1 of the present invention. Hatching of a cross section is omitted in the figure.

FIG. 3 is a longitudinal sectional view of the compressor 12 according to Embodiment 1 of the present invention. Hatching of a cross section is omitted in the figure.

In Embodiment 1, the compressor 12 is a single-cylinder rotary compressor. Even if the compressor 12 is a multicylinder rotary compressor or a scroll compressor, Embodiment 1 can be applied.

In FIG. 3, the compressor 12 includes an airtight container 20, a compression element 30, an electrically operated element 40, and a shaft 50.

The airtight container 20 is an example of the container. The airtight container 20 is equipped with a suction pipe 21 for sucking refrigerant and a discharge pipe 22 for discharging refrigerant.

The compression element 30 is disposed in the airtight container 20. More specifically, the compression element 30 is disposed in an inner lower portion of the airtight container 20. The compression element 30 compresses refrigerant sucked by the suction pipe 21.

The electrically operated element 40 is also disposed in the airtight container 20. More specifically, the electrically operated element 40 in the airtight container 20 is disposed in a position through which refrigerant compressed by the compression element 30 is discharged from the discharge pipe 22. Thus, the electrically operated element 40 in the airtight container 20 is disposed over the compression element 30. The electrically operated element 40 drives the compression element 30. The electrically operated element 40 is a motor with concentrated winding.

The refrigerating machine oil 60 for lubricating a slide portion of the compression element 30 is stored at the bottom of the airtight container 20.

The compression element 30 will be described in detail below.

The compression element 30 includes a cylinder 31, a rolling piston 32, a vane 33, a main bearing 34, and an auxiliary bearing 35.

The cylinder 31 has an approximately circular periphery in a plan view from the top. The cylinder 31 includes a compression chamber 31*a*, which is an approximately circular space in a plan view from the top. The compression chamber 31*a* has an opening at each end in the axial direction.

The cylinder 31 has a vane groove 31*b*, which communicates with the compression chamber 31*a* and extends radially. A back-pressure chamber is disposed outside the vane groove 31*b*. The back-pressure chamber is an approximately circular space when viewed from the top and communicates with the vane groove 31*b*.

The cylinder 31 has a suction port 31*c* coupled to the suction pipe 21. The suction port 31*c* extends from the outer peripheral surface of the cylinder 31 to the compression chamber 31*a*.

The cylinder 31 has a discharge port (not shown) from which refrigerant compressed in the compression chamber 31*a* is discharged. The discharge port is formed by cutting an upper end face of the cylinder 31.

The rolling piston 32 is ring-shaped. The rolling piston 32 rotates in the compression chamber 31*a*. The rolling piston 32 slidably fits to the eccentric shaft portion 51 of the shaft 50.

The vane 33 is a flat, approximately rectangular parallelepiped. The vane 33 is disposed in the vane groove 31*b* of the cylinder 31. An edge 33*a* of the vane 33 is continuously pressed against the outer peripheral surface 32*a* of the rolling piston 32 by a vane spring 37 disposed in the back-pressure chamber. Thus, the outer peripheral surface 32*a* of the rolling piston 32 is in contact with the edge 33*a* of the vane 33 in a slidable manner. The vane 33 separates the inside of the compression chamber 31*a* into a space communicating with the suction port 31*c* and a space communicating with the discharge port. After the compressor 12 begins to operate, due to the high internal pressure of the airtight container 20, a force resulting from the difference in internal pressure between the airtight container 20 and the compression chamber 31*a* acts on the back side (that is, a side facing the back-pressure chamber) of the vane 33. Thus, the vane spring 37 is mainly used to press the vane 33 against the rolling piston 32 when the compressor 12 begins to operate (when there is no difference in internal pressure between the airtight container 20 and the compression chamber 31*a*).

The main bearing 34 is approximately inverted T-shaped when viewed in the horizontal direction. The main bearing 34 slidably fits to a main shaft portion 52 of the shaft 50 above the eccentric shaft portion 51. The main bearing 34 occludes the upper sides of the compression chamber 31*a* and the vane groove 31*b* in the cylinder 31.

The auxiliary bearing 35 is approximately T-shaped when viewed in the horizontal direction. The auxiliary bearing 35 slidably fits to an auxiliary shaft portion 53 of the shaft 50 below the eccentric shaft portion 51. The auxiliary bearing 35 occludes the lower sides of the compression chamber 31*a* and the vane groove 31*b* in the cylinder 31.

The main bearing 34 includes a discharge valve (not shown). A discharge muffler 36 is disposed outside the main bearing 34. High-temperature and high-pressure gas refrigerant discharged through the discharge valve first enters the discharge muffler 36 and is subsequently discharged from the discharge muffler 36 into a space in the airtight container 20. The discharge valve and the discharge muffler 36 may be disposed on the auxiliary bearing 35 or on both the main bearing 34 and the auxiliary bearing 35.

The cylinder 31, the rolling piston 32, the vane 33, the main bearing 34, the auxiliary bearing 35, and the shaft 50 are in contact with adjacent members in a slidable manner. In Embodiment 1, these members are formed of steel composed mainly of iron (Fe). In other words, the base metal of these members is steel composed mainly of iron (Fe). More specifically, the materials of the cylinder 31, the main bearing 34, and the auxiliary bearing 35 are gray cast iron, sintered steel, and carbon steel, for example. The material of the rolling piston 32 may be alloy steel containing chromium. The material of the vane 33 is high-speed tool steel, for example. In Embodiment 1, the rolling piston 32 and the vane 33 are not surface-treated. In other words, the base metals of the rolling piston 32 and the vane 33 are exposed.

A member formed of a base metal, the base metal being steel and being exposed at a portion in contact with at least an adjacent member (slide portion), corresponds to the first member according to an embodiment of the present invention. A portion of the first member in contact with an adjacent member (slide portion) corresponds to the first contact portion according to an embodiment of the present invention. Thus, the rolling piston 32 corresponds to the first member according to an embodiment of the present invention. The outer peripheral surface 32*a* of the rolling piston 32 corresponds to the first contact portion according to an embodiment of the present invention. When viewed from the rolling piston 32, the vane 33 in slidable contact with the rolling piston 32 corresponds to the second member according to an embodiment of the present invention. The edge 33*a* of the vane 33, which is a portion in contact with the outer peripheral surface 32*a* of the rolling piston 32 (slide portion), corresponds to the second contact portion according to an embodiment of the present invention.

The base metal of the vane 33 is also exposed at a portion in contact with at least an adjacent member (slide portion). Thus, the vane 33 also corresponds to the first member according to an embodiment of the present invention. The edge 33*a* of the vane 33 corresponds to the first contact portion according to an embodiment of the present invention. When viewed from the vane 33, the rolling piston 32 in slidable contact with the vane 33 corresponds to the second member according to an embodiment of the present invention. The outer peripheral surface 32*a* of the rolling piston 32, which is a portion in contact with the edge 33*a* of the vane 33 (slide portion), corresponds to the second contact portion according to an embodiment of the present invention.

A suction muffler 23 is disposed beside the airtight container 20. The suction muffler 23 sucks low-pressure gas refrigerant from an evaporator. The suction muffler 23 prevents return liquid refrigerant from directly entering the compression chamber 31*a* of the cylinder 31. The suction muffler 23 is coupled to the suction port 31*c* of the cylinder 31 via the suction pipe 21. The main body of the suction muffler 23 is fixed to the side of the airtight container 20, for example, by welding.

The electrically operated element 40 will be described in detail below.

In Embodiment 1, the electrically operated element 40 is a brushless direct current (DC) motor. Even if the electrically operated element 40 is a motor other than brushless DC motors (for example, an induction motor), Embodiment 1 can be applied.

The electrically operated element 40 includes a stator 41 and a rotor 42.

The stator 41 abuts and is fixed to the inner peripheral surface of the airtight container 20. The rotor 42 is disposed inside the stator 41 with a gap in the range of approximately 0.3 to 1 mm therebetween.

The stator 41 includes a stator core 43 and a stator coil 44. The stator core 43 is manufactured by punching magnetic steel sheets with a thickness in the range of 0.1 to 1.5 mm in a predetermined shape, stacking the magnetic steel sheets in the axial direction, and fixing the magnetic steel sheets, for example, by caulking or welding. The stator coil 44 is concentratedly wound around the stator core 43 with an insulating member 48 interposed therebetween. The material of the insulating member 48 is poly(ethylene terephthalate) (PET), poly(butylene terephthalate) (PBT), a tetrafluoroethylene-hexafluoropropylene copolymer (FEP), a tetrafluoroethylene-perfluoroalkyl vinyl ether copolymer (PFA), polytetrafluoroethylene (PTFE), a liquid crystal polymer (LCP), poly(phenylene sulfide) (PPS), or a phenolic resin, for example. The stator coil 44 is connected to a lead wire 45.

Notches are formed on the periphery of the stator core 43 in the circumferential direction at substantially evenly spaced intervals. Each of the notches serves as a flow path for gas refrigerant discharged from the discharge muffler 36 into a space in the airtight container 20. Each of the notches also serves as a flow path for the refrigerating machine oil 60 returning from the top of the electrically operated element 40 to the bottom of the airtight container 20.

The rotor 42 includes a rotor core 46 and a permanent magnet (not shown). In the same manner as in the stator core 43, the rotor core 46 is manufactured by punching magnetic steel sheets with a thickness in the range of 0.1 to 1.5 mm in a predetermined shape, stacking the magnetic steel sheets in the axial direction, and fixing the magnetic steel sheets, for example, by caulking or welding. The permanent magnet is inserted into openings formed in the rotor core 46. The permanent magnet is a ferrite magnet or a rare-earth magnet, for example.

Through-holes pass through the rotor core 46 approximately in the axial direction. In the same manner as in the notches of the stator core 43, each of the through-holes serves as a flow path for gas refrigerant discharged from the discharge muffler 36 into a space in the airtight container 20.

A power supply terminal 24 (for example, a glass terminal) for connection to an external power supply is disposed on the top of the airtight container 20. The power supply terminal 24 is fixed to the airtight container 20, for example, by welding. The power supply terminal 24 is connected to the lead wire 45 extending from the electrically operated element 40.

The discharge pipe 22 is disposed on the top of the airtight container 20 and has an opening at each end in the axial direction. Gas refrigerant discharged from the compression element 30 is discharged from a space in the airtight container 20 to the outside through the discharge pipe 22.

The operation of the compressor 12 will be described below.

Electric power is supplied to the stator 41 of the electrically operated element 40 from the power supply terminal 24 via the lead wire 45. This rotates the rotor 42 of the electrically operated element 40. The rotation of the rotor 42 causes the shaft 50 fixed to the rotor 42 to rotate. The rotation of the shaft 50 causes the rolling piston 32 of the compression element 30 to rotate eccentrically in the compression chamber 31a of the cylinder 31 in the compression element 30. The space between the cylinder 31 and the rolling piston 32 is separated into two by the vane 33 of the compression element 30. The volumes of the two spaces change with the rotation of the shaft 50. In one of the spaces, with a gradual increase in volume, a refrigerant mixture is sucked from the suction muffler 23. In the other of the spaces, with a gradual decrease in volume, a gaseous refrigerant mixture is compressed. The compressed gaseous refrigerant mixture is discharged from the discharge muffler 36 to a space in the airtight container 20. The discharged gaseous refrigerant mixture passes through the electrically operated element 40 and is discharged from the discharge pipe 22 on the top of the airtight container 20 to the outside of the airtight container 20.

Decompose of HFO-1123 produces fluoride ions. Fluoride ions produced by the decomposition react with an additive (such as an anti-wear agent) of refrigerating machine oil and produce sludge. In particular, HFO-1123 has a very short atmospheric lifetime of 1.6 days. Thus, the refrigeration cycle apparatus 10 according to Embodiment 1 in which a refrigerant mixture inclusive of HFO-1123 is used produces more sludge than refrigeration cycle apparatuses in which a refrigerant free of HFO-1123 is used, and the refrigerant circuit 11 may be clogged with sludge.

However, since the refrigeration cycle apparatus 10 according to Embodiment 1 is configured as described above, the refrigerant circuit 11 can be prevented from being clogged with sludge. More specifically, HFO-1123 tends to be decomposed at high temperatures. Thus, decomposition of HFO-1123 occurs mostly at a high-temperature slide portion of the compressor 12. In Embodiment 1, the rolling piston 32 and the vane 33, which constitute a slide portion in the compressor 12, are formed of steel. The rolling piston 32 and the vane 33 are not surface-treated. Thus, fluoride ions produced by the decomposition of HFO-1123 react with an iron (Fe) component of the rolling piston 32 and the vane 33. Thus, iron fluoride is formed on the surfaces of the rolling piston 32 and the vane 33.

Iron fluoride can serve as a solid lubricant. Thus, a sufficient amount of iron fluoride on the surfaces of the rolling piston 32 and the vane 33 can improve sliding characteristics therebetween and can prevent wear and seizure of the rolling piston 32 and the vane 33. The present inventor found that fluoride ions produced by the decomposition of HFO-1123 tends to react with a phosphoric ester. Thus, the refrigerating machine oil 60 is designed to be free of phosphoric esters. Thus, a sufficient number of fluoride ions can be supplied to the surface of the rolling piston 32 and the vane 33.

Friction between the rolling piston 32 and the vane 33 at the contact portion or slide portion wears away iron fluoride formed on the surface of the rolling piston 32 and the vane 33. In an area of the contact portion between the rolling piston 32 and the vane 33 in which iron fluoride is worn away, a chemical reaction occurs between fluoride ions and an iron (Fe) component to produce new iron fluoride. Thus, fluoride ions produced by the decomposition of HFO-1123 are continuously consumed at the contact portion between the rolling piston 32 and the vane 33.

In the refrigeration cycle apparatus 10 according to Embodiment 1, a chemical reaction between fluoride ions produced by the decomposition of HFO-1123 and an iron (Fe) component produces iron fluoride on the rolling piston 32 and the vane 33. A sufficient number of fluoride ions are supplied to the contact portion (slide portion) between the rolling piston 32 and the vane 33 without adding a phosphoric ester reactive to HFO-1123 to the refrigerating machine oil 60 such that iron fluoride is formed at the contact portion (slide portion) between the rolling piston 32 and the vane 33 without causing seizure at the contact portion (slide portion). Thus, the compressor 12 and the refrigeration cycle apparatus 10 according to Embodiment 1 can continuously consume fluoride ions produced by the decomposition of HFO-1123 at the contact portion (slide portion) between the rolling piston 32 and the vane 33. Thus, the compressor 12 and the refrigeration cycle apparatus 10 according to Embodiment 1 can reduce sludge production in the refrigerant circuit 11. The compressor 12 and the refrigeration cycle apparatus 10 according to Embodiment 1 also have the effect of reducing sludge production due to no chemical reaction between fluoride ions and a phosphoric ester. Thus, the compressor 12 and the refrigeration cycle apparatus 10 according to Embodiment 1 can prevent the refrigerant circuit 11 from being clogged with sludge.

In Embodiment 1, the refrigerating machine oil 60 has a saturated water content of 1000 wt ppm or more. Fluoride ions produced by the decomposition of HFO-1123 also react with water in the refrigerant circuit 11 and produce sludge. The use of the refrigerating machine oil 60 with a saturated water content of 1000 wt ppm or more can reduce the amount of water not dissolved in the refrigerating machine oil 60, that is, the amount of water that reacts with HFO-1123 and produces sludge in the refrigerant circuit 11. Thus, the use of the refrigerating machine oil 60 with a saturated water content of 1000 wt ppm or more can further prevent the refrigerant circuit 11 from being clogged with sludge. This can also increase the number of fluoride ions supplied to the rolling piston 32 and the vane 33 and can therefore prevent seizure at the contact portion (slide portion) between the rolling piston 32 and the vane 33.

There are refrigerants other than HFO-1123, such as R32, that can produce fluoride ions by decomposition. However, these refrigerants including R32 produce a smaller number of fluoride ions than HFO-1123 by decomposition. Thus, these refrigerants including R32 used in the refrigerant circuit 11 according to Embodiment 1 cannot produce a sufficient amount of iron fluoride on the surfaces of the rolling piston 32 and the vane 33 and cannot improve the sliding characteristics of the rolling piston 32 and the vane 33. Thus, when a refrigerant other than HFO-1123 (such as R32) that produces fluoride ions by decomposition is used in a refrigeration cycle apparatus, a person skilled in the art improves the sliding characteristics of a rolling piston and a vane with an anti-wear agent added to refrigerating machine oil.

It should be noted that Embodiment 1, in which fluoride ions produced by the decomposition of HFO-1123 are consumed at the contact portion between the rolling piston 32 and the vane 33, is based on a completely novel idea that a person skilled in the art cannot come up with.

In Embodiment 1, neither the rolling piston 32 nor the vane 33 are surface-treated. However, only one of the rolling piston 32 and the vane 33 may not be surface-treated. Furthermore, it is not necessary that the entire surface is not surface-treated, and it is sufficient not to surface-treat at least a contact portion (slide portion). Fluoride ions produced by the decomposition of HFO-1123 can be continuously consumed at the contact portion (slide portion), and this can prevent the refrigerant circuit 11 from being clogged with sludge.

Steel members not subjected to surface treatment, that is, members corresponding to the first member according to an embodiment of the present invention are not limited to the rolling piston 32 and the vane 33. Other configurations are applicable as long as steel is used to form at least one of the members constituting a slide portion of a compressor and at least a contact portion (slide portion) of the steel member(s) is not surface-treated. This enables fluoride ions produced by the decomposition of HFO-1123 to be continuously consumed at the contact portion (slide portion) and can prevent the refrigerant circuit 11 from being clogged with sludge.

For example, in the compressor 12, which is a rotary compressor, the cylinder 31, the rolling piston 32, the vane 33, the main bearing 34, the auxiliary bearing 35, and the shaft 50 constitute a slide portion of the compressor 12. Thus, other configurations are applicable as along as at least one of these members is formed from steel and at least a contact portion (slide portion) of the steel member(s) is not surface-treated. This enables fluoride ions produced by the decomposition of HFO-1123 to be continuously consumed at the contact portion (slide portion) and can prevent the refrigerant circuit 11 from being clogged with sludge.

Among the slide portions of the compressor 12, the contact portion (slide portion) between the rolling piston 32 and the vane 33 is the most difficult portion to supply with the refrigerating machine oil 60. More specifically, among the slide portions of the compressor 12, the contact portion (slide portion) between the rolling piston 32 and the vane 33 has the highest temperature and is most likely to induce the decomposition of HFO-1123. Thus, forming at least one of the rolling piston 32 and the vane 33 from steel and not surface-treating at least a contact portion (slide portion) of the steel member(s) can increase the consumption of fluoride ions produced by the decomposition of HFO-1123 and more reliably prevent the refrigerant circuit 11 from being clogged with sludge.

In the refrigeration cycle apparatus 10 according to Embodiment 1, not only a phosphoric ester but also any anti-wear agent may not be added to the refrigerating machine oil 60. This is because, as described above, forming a slide member from steel and not surface-treating at least a contact portion (slide portion) can produce sufficient iron fluoride at the contact portion to prevent seizure. HFO-1123 reacts with an anti-wear agent other than phosphoric esters and produces sludge. No addition of any anti-wear agent to the refrigerating machine oil 60 can further prevent the refrigerant circuit 11 from being clogged with sludge.

Embodiment 2

The refrigeration cycle apparatus 10 can also be configured as described below to prevent the refrigerant circuit 11 from being clogged with sludge. Some identical items in Embodiments 1 and 2 are omitted in Embodiment 2, and the same functions and constituents are denoted by the same reference numerals.

Figure 4:
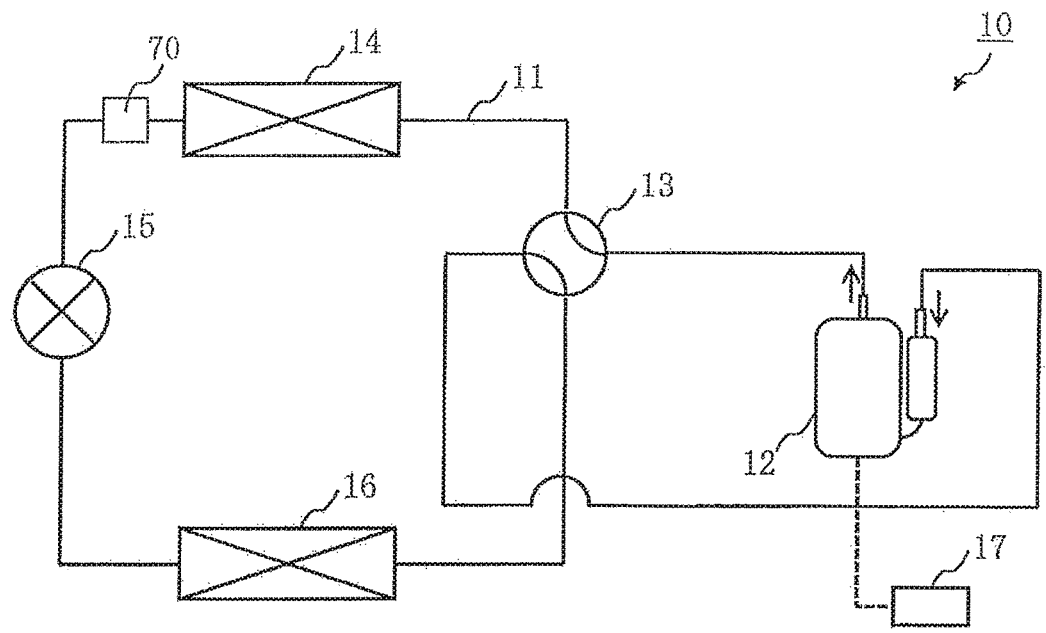
FIG. 4 is a circuit diagram of a refrigeration cycle apparatus 10 according to Embodiment 2 of the present invention (during cooling).

FIG. 4 is a circuit diagram of the refrigeration cycle apparatus 10 according to Embodiment 2 of the present invention. FIG. 4 is a circuit diagram of the refrigeration cycle apparatus 10 during cooling.

The refrigeration cycle apparatus 10 according to Embodiment 2 includes a dryer 70, which is disposed on a pipe between the outdoor heat exchanger 14 and the expansion valve 15 and traps water in the refrigerant circuit 11.

The position of the dryer 70 is not limited to the position illustrated in FIG. 4 and may be any position on the refrigerant circuit 11. In the refrigeration cycle apparatus 10 according to Embodiment 2, the constituents of the refrigerating machine oil 60 are not limited to the constituents described in Embodiment 1. For example, a phosphoric ester may be added to the refrigerating machine oil 60. For example, the refrigerating machine oil 60 may have a saturated water content of less than 1000 wt ppm.

As described above, HFO-1123 also reacts with water in the refrigerant circuit 11 and produces sludge. The dryer 70 in the refrigeration cycle apparatus 10 according to Embodiment 2 can reduce the amount of water that reacts with HFO-1123 and produces sludge in the refrigerant circuit 11. Thus, the refrigeration cycle apparatus 10 according to Embodiment 2 can reduce sludge production in the refrigerant circuit 11 and can prevent the refrigerant circuit 11 from being clogged with sludge.

The refrigeration cycle apparatus 10 according to Embodiment 1 may include the dryer 70 described in Embodiment 2. The dryer 70 can further improve the effect of reducing sludge production described in Embodiment 1 and can further prevent the refrigerant circuit 11 from being clogged with sludge.

Embodiment 3

The refrigeration cycle apparatus 10 can also be configured as described below to prevent the refrigerant circuit 11 from being clogged with sludge. Some identical items in Embodiments 1 and 3 are omitted in Embodiment 3, and the same functions and constituents are denoted by the same reference numerals.

Figure 5:
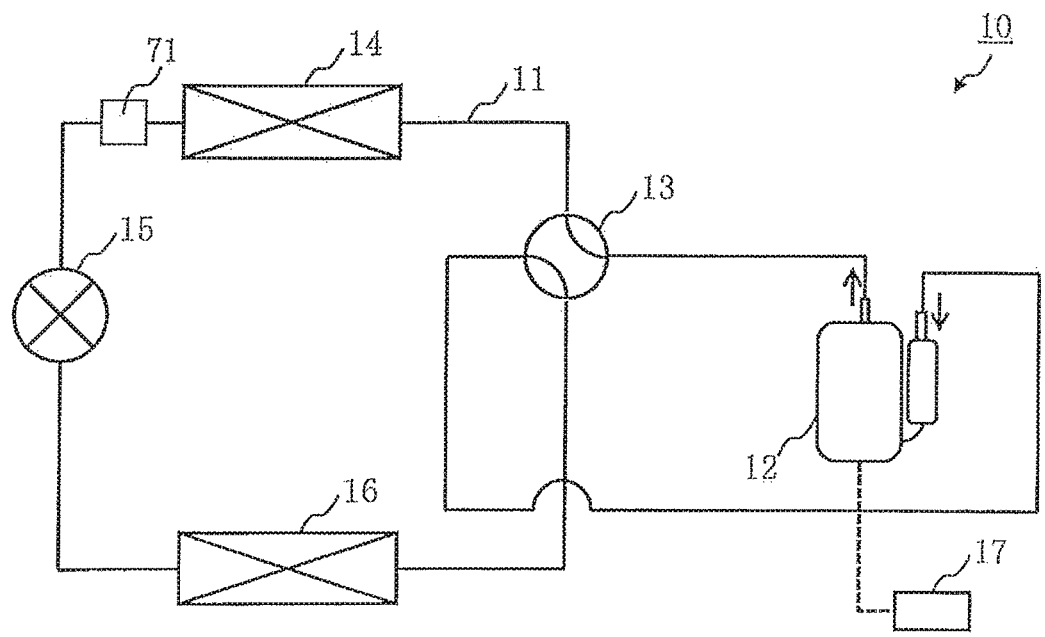
FIG. 5 is a circuit diagram of a refrigeration cycle apparatus 10 according to Embodiment 3 of the present invention (during cooling).

FIG. 5 is a circuit diagram of the refrigeration cycle apparatus 10 according to Embodiment 3 of the present invention. FIG. 5 is a circuit diagram of the refrigeration cycle apparatus 10 during cooling.

The refrigeration cycle apparatus 10 according to Embodiment 3 includes a filter 71 on a pipe between the outdoor heat exchanger 14 and the expansion valve 15. The filter 71 filters out precipitated sludge in the refrigerant circuit 11. The outdoor heat exchanger 14 serves as a condenser during cooling.

In the refrigeration cycle apparatus 10 according to Embodiment 3, the composition of the refrigerating machine oil 60 is not limited to the composition described in Embodiment 1. For example, a phosphoric ester may be added to the refrigerating machine oil 60. For example, the refrigerating machine oil 60 may have a saturated water content of less than 1000 wt ppm.

Figure 6:
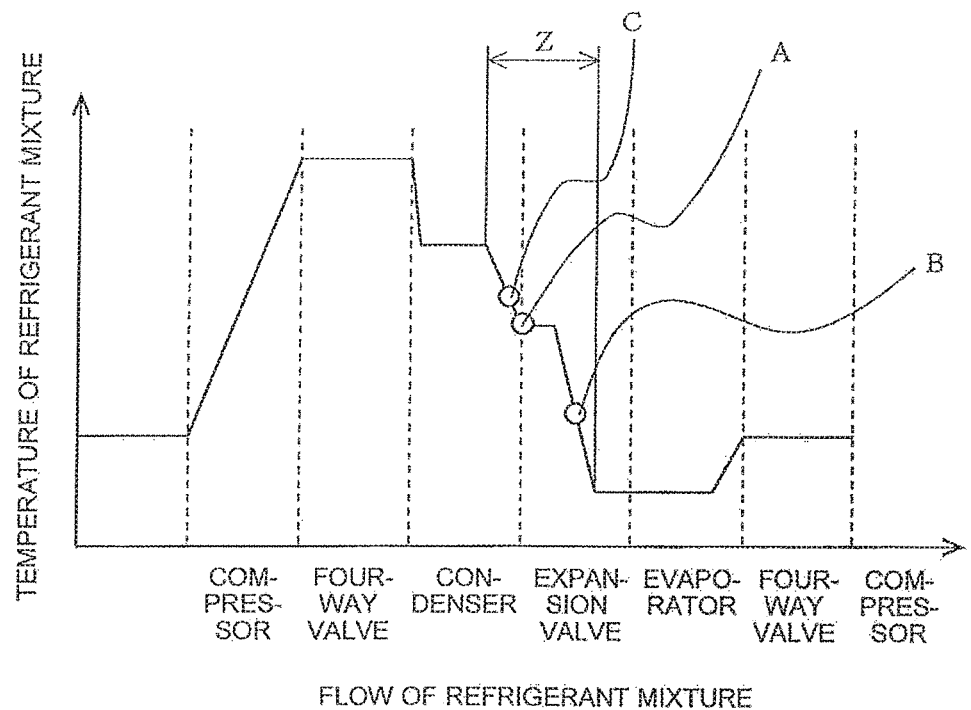
FIG. 6 is a graph of the temperature change of a refrigerant mixture in the refrigeration cycle apparatus 10 according to Embodiment 3 of the present invention.

FIG. 6 is a graph of the temperature change of a refrigerant mixture in the refrigeration cycle apparatus 10 according to Embodiment 3 of the present invention. The temperature change of a refrigerant mixture is the same in Embodiments 1 and 2 and the embodiments described later.

A gaseous refrigerant mixture sucked by the compressor 12 is compressed by the compressor 12 and becomes a high-temperature gaseous refrigerant mixture. The refrigerant mixture flows into the condenser through the four-way valve 13. The outdoor heat exchanger 14 serves as a condenser during cooling, and the indoor heat exchanger 16 serves as a condenser during heating. The high-temperature gaseous refrigerant mixture in the condenser is cooled, for example, by air supplied to the condenser and is condensed. More specifically, the refrigerant mixture immediately after flowing into the condenser is gaseous, and the temperature of the refrigerant mixture decreases gradually. After a while, the refrigerant mixture has a two-phase gas-liquid state and is then isothermally condensed. After the refrigerant mixture is condensed to liquid, the temperature of the refrigerant mixture decreases gradually. The state in which the temperature of the liquid refrigerant mixture decreases in the condenser is hereinafter referred to as a subcooled state.

The liquid refrigerant mixture from the condenser flows into the expansion valve 15 and is expanded. During expansion, the refrigerant mixture is further cooled and has a two-phase gas-liquid state. The refrigerant mixture in the two-phase gas-liquid state from the expansion valve 15 flows into the evaporator. The indoor heat exchanger 16 serves as an evaporator during cooling, and the outdoor heat exchanger 14 serves as an evaporator during heating. The refrigerant mixture in the two-phase gas-liquid state in the evaporator is heated, for example, by air supplied to the evaporator and is evaporated. More specifically, the refrigerant mixture immediately after flowing into the evaporator has a two-phase gas-liquid state and is isothermally evaporated. After the refrigerant mixture is evaporated to gas, the temperature of the refrigerant mixture increases. The refrigerant mixture from the evaporator is sucked by the compressor 12 again.

A chemical reaction product produced by the decomposition of HFO-1123 and a chemical reaction with an additive in the refrigerating machine oil 60 is dissolved in the refrigerating machine oil 60 when the refrigerating machine oil 60 has a high temperature. While the refrigerating machine oil 60 is cooled, the chemical reaction product is precipitated as sludge from the refrigerating machine oil 60. Thus, sludge is likely to be produced while the refrigerating machine oil 60, together with the refrigerant mixture, circulates through the refrigerant circuit 11 and is cooled. More specifically, a chemical reaction product dissolved in the refrigerating machine oil 60 is likely to be precipitated as sludge when the refrigerant mixture in the condenser has a subcooled state and when the refrigerant mixture is expanded in the expansion valve 15. Thus, sludge is likely to be produced in the region Z in FIG. 6.

The flow path of the refrigerant mixture in the refrigerant circuit 11 is smallest in the expansion valve 15. Thus, the expansion valve 15 is most likely to be clogged with sludge.

In Embodiment 3, therefore, the filter 71 in the refrigerant circuit 11 is disposed upstream of the expansion valve 15 in the region Z in the refrigerant mixture flow direction during cooling (position "A" in FIG. 6). More specifically, the filter 71 is disposed on the pipe between the outdoor heat exchanger 14, which serves as a condenser during cooling, and the expansion valve 15.

The filter 71 in the refrigerant circuit 11 can filter out sludge precipitated in the refrigerant circuit 11 and prevent the expansion valve 15 from being clogged with sludge. Thus, the refrigerant circuit 11 of the refrigeration cycle apparatus 10 according to Embodiment 3 can be prevented from being clogged with sludge.

The refrigeration cycle apparatus 10 according to Embodiment 1 may include the filter 71 described in Embodiment 3. In Embodiment 1, although sludge production is suppressed, sludge is slightly produced in the refrigerant circuit 11. The filter 71 described in Embodiment 3 can be used in the refrigeration cycle apparatus 10 according to Embodiment 1 to filter out sludge precipitated in the refrigerant circuit 11 and can thereby further prevent the refrigerant circuit 11 from being clogged with sludge.

Although the filter 71 is disposed between the outdoor heat exchanger 14 and the expansion valve 15 in Embodiment 3, the filter 71 may be disposed between the indoor heat exchanger 16 and the expansion valve 15. The filter 71 can filter out sludge precipitated in the refrigerant circuit 11 during heating and can thereby further prevent the refrigerant circuit 11 from being clogged with sludge. As a matter of course, the filter 71 may be disposed between the outdoor heat exchanger 14 and the expansion valve 15 and between the indoor heat exchanger 16 and the expansion valve 15.

Embodiment 4

The refrigeration cycle apparatus 10 can also be configured as described below to prevent the refrigerant circuit 11 from being clogged with sludge. Some identical items in Embodiments 1 to 4 are omitted in Embodiment 4, and the same functions and constituents are denoted by the same reference numerals.

In the refrigeration cycle apparatus 10 according to Embodiment 4, a needle expansion valve with a variable opening degree is used as the expansion valve 15 described in Embodiments 1 to 3. Even when sludge is deposited inside the expansion valve 15, the opening degree is increased in proportion to the amount of deposited sludge. This can prevent the expansion valve 15 from being clogged with sludge and can prevent the refrigerant circuit 11 from being clogged with sludge.

The opening degree of the expansion valve 15 is controlled by the controller 17. For example, the controller 17 performs known control for stable operation of the refrigeration cycle apparatus 10, such as subcooling degree control in which the degree of subcooling of refrigerant in the condenser is held constant or superheat degree control in which the degree of superheat of refrigerant in the evaporator is held constant. Thus, the opening degree of the expansion valve 15 can be increased according to the amount of deposited sludge.

Embodiment 5

The refrigeration cycle apparatus 10 can also be configured as described below to prevent the refrigerant circuit 11 from being clogged with sludge. Some identical items in Embodiments 1 and 5 are omitted in Embodiment 5, and the same functions and constituents are denoted by the same reference numerals.

Figure 7:
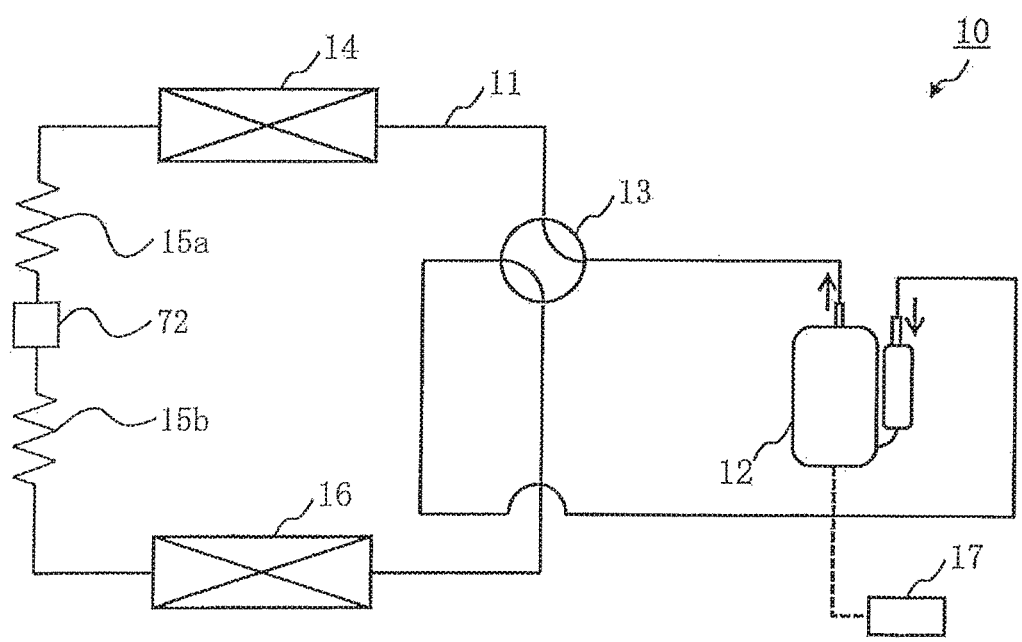
FIG. 7 is a circuit diagram of a refrigeration cycle apparatus 10 according to Embodiment 5 of the present invention (during cooling).

FIG. 7 is a circuit diagram of the refrigeration cycle apparatus 10 according to Embodiment 5 of the present invention. FIG. 7 is a circuit diagram of the refrigeration cycle apparatus 10 during cooling.

The refrigeration cycle apparatus 10 according to Embodiment 5 includes two capillary tubes 15a and 15b as expansion mechanisms instead of the expansion valve 15 described in Embodiments 1 to 4. The two capillary tubes 15a and 15b are disposed in series on the pipe between the outdoor heat exchanger 14 and the indoor heat exchanger 16. The pipe between the outdoor heat exchanger 14 and the indoor heat exchanger 16 is provided with a filter 72, which filters out sludge precipitated in the refrigerant circuit 11 between the capillary tube 15a and the capillary tube 15b. The filter 72 in Embodiment 5 is disposed at a position "B" in FIG. 6.

In the refrigeration cycle apparatus 10 according to Embodiment 5, the composition of the refrigerating machine oil 60 is not limited to the composition described in Embodiment 1. For example, a phosphoric ester may be added to the refrigerating machine oil 60. For example, the refrigerating machine oil 60 may have a saturated water content of less than 1000 wt ppm.

As described above, a chemical reaction product produced by a chemical reaction with an additive in the refrigerating machine oil 60 becomes less soluble in the refrigerating machine oil 60 as the refrigerating machine oil 60 is cooled, and the chemical reaction product is precipitated as sludge. Thus, one of the capillary tubes 15a and 15b in series disposed downstream in the refrigerant mixture flow direction is likely to be clogged with sludge. The capillary tube disposed downstream in the refrigerant mixture flow direction is the capillary tube 15b during cooling or the capillary tube 15a during heating.

However, the refrigeration cycle apparatus 10 according to Embodiment 5 includes the filter 72 between the capillary tube 15a and the capillary tube 15b, as described above. Thus, in the refrigeration cycle apparatus 10 according to Embodiment 5, the downstream capillary tube in the refrigerant mixture flow direction can be prevented from being clogged with sludge. In the refrigeration cycle apparatus 10 according to Embodiment 5, sludge produced during the expansion of the refrigerant mixture can be filtered out. Thus, the refrigerant circuit 11 of the refrigeration cycle apparatus 10 according to Embodiment 5 can be prevented from being clogged with sludge.

The refrigeration cycle apparatus 10 according to Embodiment 1 may include the capillary tubes 15a and 15b and the filter 72 described in Embodiment 5. In Embodiment 1, although sludge production is suppressed, sludge is slightly produced in the refrigerant circuit 11. The capillary tubes 15a and 15b and the filter 72 described in Embodiment 5 can be used in the refrigeration cycle apparatus 10 according to Embodiment 1. The filter 72 can filter out sludge precipitated in the refrigerant circuit 11 and can thereby further prevent the refrigerant circuit 11 from being clogged with sludge.

If the refrigeration cycle apparatus 10 according to Embodiment 5 is configured to only perform cooling or heating, the upstream capillary tube in the refrigerant mixture flow direction may have a larger inner diameter (flow path) than the downstream capillary tube in the refrigerant mixture flow direction. This can further prevent the upstream capillary tube in the refrigerant mixture flow direction from being clogged with sludge and can further prevent the refrigerant circuit 11 from being clogged with sludge.

The expansion mechanism of the refrigeration cycle apparatus 10 according to Embodiment 5 is not limited to the capillary tubes. For example, needle expansion valves with a variable opening degree may be disposed in series. However, the use of the capillary tubes as the expansion mechanism of the refrigeration cycle apparatus 10 according to Embodiment 5 can reduce the cost of the refrigeration cycle apparatus 10.

Embodiment 6

The refrigeration cycle apparatus 10 can also be configured as described below to prevent the refrigerant circuit 11 from being clogged with sludge. Some identical items in Embodiments 1 and 6 are omitted in Embodiment 6, and the same functions and constituents are denoted by the same reference numerals.

Figure 8:
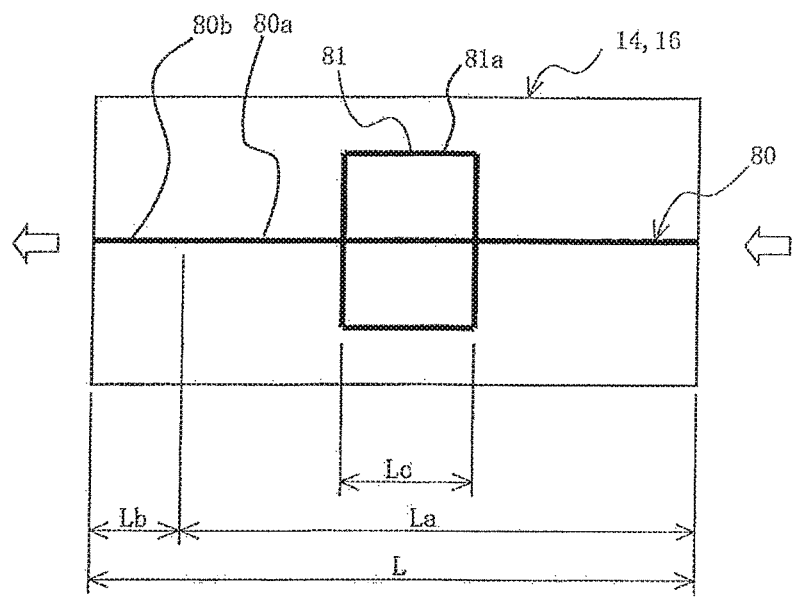
FIG. 8 is an explanatory view of a refrigerant flow path of a condenser according to Embodiment 6 of the present invention.

FIG. 8 is an explanatory view of a refrigerant flow path of a condenser according to Embodiment 6 of the present invention. The white arrow in FIG. 8 indicates the refrigerant mixture flow direction.

Before describing the entire structure of the refrigeration cycle apparatus 10 according to Embodiment 6, a refrigerant flow path 80 of the outdoor heat exchanger 14, which serves as a condenser during cooling, and the indoor heat exchanger 16, which serves as a condenser during heating, will be described below with reference to FIG. 8.

The outdoor heat exchanger 14, which serves as a condenser during cooling, and the indoor heat exchanger 16, which serves as a condenser during heating, include the refrigerant flow path 80 through which the refrigerant mixture flows. As described above, the refrigerant flowing through the refrigerant flow path 80 of the condenser to a certain position away from the inlet of the refrigerant flow path 80 has a gaseous or two-phase gas-liquid state. Subsequently, the refrigerant flowing through the refrigerant flow path 80 of the condenser has a subcooled state in which liquid refrigerant flows.

As illustrated in FIG. 8, in Embodiment 6, the portion of the refrigerant flow path 80 through which the refrigerant mixture flows in the gaseous or two-phase gas-liquid state is defined as a first refrigerant flow path 80a. The first refrigerant flow path 80a has a length La. The portion of the refrigerant flow path 80 through which the refrigerant mixture flows as liquid, that is, the portion of the refrigerant flow path 80 downstream of the first refrigerant flow path 80a in the refrigerant mixture flow direction is defined as a second refrigerant flow path 80b. The second refrigerant flow path 80b has a length Lb. The length La of the first refrigerant flow path 80a depends on the operating conditions of the refrigeration cycle apparatus 10 and is 50% of the total length L (=La+Lb) of the refrigerant flow path 80 in Embodiment 6.

As illustrated in FIG. 8, a portion of the refrigerant flow path 80 may be a branched portion 81 composed of branched refrigerant flow paths 81a. In this case, each of the branched refrigerant flow paths 81a has a length Lc, and the refrigerant flow path in the branched portion 81 has the length Lc.

Figure 9:
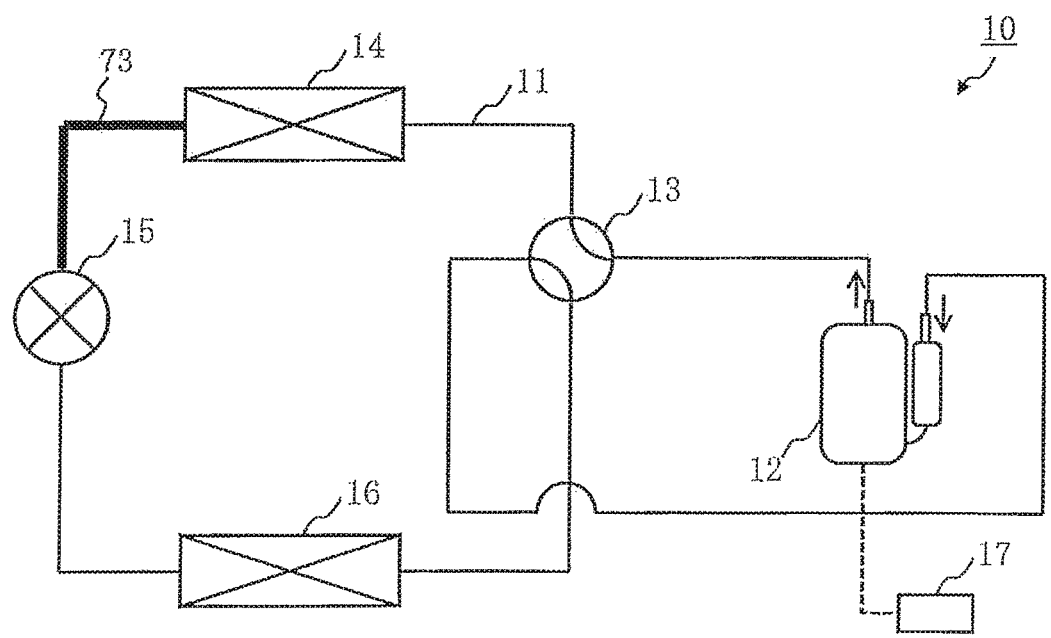
FIG. 9 is a circuit diagram of a refrigeration cycle apparatus 10 according to Embodiment 6 of the present invention (during cooling).

FIG. 9 is a circuit diagram of the refrigeration cycle apparatus 10 according to Embodiment 6 of the present invention. FIG. 9 is a circuit diagram of the refrigeration cycle apparatus 10 during cooling.

In the refrigeration cycle apparatus 10 according to Embodiment 6, at least one of the second refrigerant flow path 80b of the condenser and the pipe between the condenser and the expansion valve 15 has an expanded pipe portion 73 with a larger flow path cross-section than the first refrigerant flow path 80a of the condenser. In Embodiment 6, the diameter of the pipe between the outdoor heat exchanger 14, which serves as a condenser during cooling, and the expansion valve 15 is increased to form the expanded pipe portion 73.

The flow path cross-section is the cross-section of the refrigerant flow path 80 and the inside of the pipe (the space through which the refrigerant mixture flows) perpendicular to the refrigerant mixture flow direction. As illustrated in FIG. 8, a portion of the refrigerant flow path 80 may be a branched portion 81 composed of branched refrigerant flow paths 81a. In this case, the flow path cross-section of the branched portion 81 is the sum total of the flow path cross-sections of the branched refrigerant flow paths 81a.

A liquid refrigerant mixture flows through the second refrigerant flow path 80b of the condenser and the pipe between the condenser and the expansion valve 15. The flow path through which liquid refrigerant flows has a low pressure loss, and the refrigerant flowing through the flow path has a low flow rate. Thus, it should be noted that, in general, a person skilled in the art decreases the cross-section of a flow path through which liquid refrigerant flows as compared with the cross-section of a flow path through which refrigerant in a two-phase gas-liquid state flows.

In Embodiment 6, 2% or more by weight of an acid scavenger is added to the refrigerating machine oil 60. The acid scavenger reacts with an acid in the refrigerant circuit 11 and is precipitated as sludge. Thus, the amount of acid scavenger added to refrigerating machine oil to prevent excess sludge production has hitherto been limited to less than 2% by weight. In the refrigeration cycle apparatus 10 according to Embodiment 6, the amount of acid scavenger added to the refrigerating machine oil 60 is increased to actively precipitate sludge.

In the refrigeration cycle apparatus 10 according to Embodiment 6, the composition of the refrigerating machine oil 60 is not limited to the composition described in Embodiment 1. For example, a phosphoric ester may be added to the refrigerating machine oil 60. For example, the refrigerating machine oil 60 may have a saturated water content of less than 1000 wt ppm.

HFO-1123, which tends to decompose in a high-temperature environment, decomposes at high temperatures in the compressor 12. Fluoride ions produced by the decomposition of HFO-1123 react with water in the refrigerant circuit 11 and produce hydrofluoric acid. A chemical reaction product produced by a chemical reaction between hydrofluoric acid and the acid scavenger is dissolved in the refrigerating machine oil 60 while the refrigerating machine oil 60 has a high temperature. While the refrigerating machine oil 60 is cooled, the chemical reaction product is precipitated as sludge from the refrigerating machine oil 60. Thus, sludge is produced in the region Z in FIG. 6.

As described above, in the refrigeration cycle apparatus 10 according to Embodiment 6, the second refrigerant flow path 80b of the condenser and at least one of the pipes between the condenser and the expansion valve 15 have the expanded pipe portion 73 with a larger flow path cross-section than the first refrigerant flow path 80a of the condenser. In other words, the refrigeration cycle apparatus 10 according to Embodiment 6 includes the expanded pipe portion 73 at a position in the region Z in FIG. 6 upstream of the expansion valve 15 in the refrigerant mixture flow direction during cooling (position "C" in FIG. 6).

The expanded pipe portion 73 through which the liquid refrigerant mixture flows has a larger flow path cross-section than the first refrigerant flow path 80a of the condenser through which the refrigerant mixture in the gaseous or two-phase gas-liquid state flows. Thus, the flow rate of the refrigerant mixture decreases in the expanded pipe portion 73, and precipitated sludge is deposited on the inner wall of the expanded pipe portion 73. Due to its large flow path cross-section, the expanded pipe portion 73 is not clogged with sludge deposited on the inner wall.

The expanded pipe portion 73 in the refrigerant circuit 11 can trap sludge precipitated in the refrigerant circuit 11 and prevent the expansion valve 15, which is most likely to be clogged with sludge, from being clogged with sludge. Thus, the refrigerant circuit 11 of the refrigeration cycle apparatus 10 according to Embodiment 6 can be prevented from being clogged with sludge.

The acid scavenger in Embodiment 6 is preferably an epoxy compound. Epoxy compounds have high adhesiveness and are used as adhesive materials. The use of an epoxy compound as an acid scavenger promotes deposition of sludge on the inner wall of the expanded pipe portion 73 and can further prevent the refrigerant circuit 11 from being clogged with sludge.

The refrigeration cycle apparatus 10 according to Embodiment 1 may be configured as described in Embodiment 6. More specifically, 2% or more by weight of an acid scavenger may be added to the refrigerating machine oil 60 described in Embodiment 1, and the expanded pipe portion 73 may be disposed at the position described above. In Embodiment 1, although sludge production is suppressed, sludge is slightly produced in the refrigerant circuit 11. The refrigeration cycle apparatus 10 according to Embodiment 1 may be configured as described in Embodiment 6 to trap sludge precipitated in the refrigerant circuit 11 with the expanded pipe portion 73 and thereby further prevent the refrigerant circuit 11 from being clogged with sludge.

At least one of the second refrigerant flow path 80b of the indoor heat exchanger 16, which serves as a condenser during heating, and the pipe between the indoor heat exchanger 16 and the expansion valve 15 may have the expanded pipe portion 73. The expanded pipe portion 73 can trap sludge during heating.

Although not specifically described in Embodiments 1 to 6, Embodiments 1 to 6 may be combined, if necessary. The effect of preventing the refrigerant circuit 11 from being clogged in each embodiment can synergistically further prevent the refrigerant circuit 11 from being clogged with sludge.

The refrigerating machine oil 60 to which 2% or more by weight of an acid scavenger is added may be used in the refrigeration cycle apparatus 10 described in any of Embodiments 2 to 4. Hydrofluoric acid, together with a refrigerant mixture, circulating through the refrigerant circuit 11 may corrode a metal component of the refrigerant circuit 11. However, the amount of acid scavenger added to refrigerating machine oil to prevent excess sludge production has hitherto been limited to less than 2% by weight, as described above. The refrigerant circuit 11 of the refrigeration cycle apparatuses 10 described in Embodiments 2 to 4 can be prevented from being clogged with sludge, as described above. Thus, the use of the refrigerating machine oil 60 to which 2% or more by weight of an acid scavenger is added can have an effect of preventing corrosion of metal components of the refrigerant circuit 11.

Embodiment 7

Finally, Embodiment 7 and subsequent Embodiment 8 describe suitable examples of the refrigerant mixture and the refrigerating machine oil 60 described in Embodiments 1 to 6. The refrigerant mixture and the refrigerating machine oil 60 are configured as described in Embodiments 1 to 6 except those described in Embodiment 7 and subsequent Embodiment 8.

HFO-1123 may undergo a disproportionation reaction at a high-temperature portion and may cause an explosion due to a chain of disproportionation reactions. In Embodiments 1 to 6, however, a refrigerant mixture of HFO-1123 and a refrigerant other than HFO-1123 is used, as described above. The proportion of HFO-1123 in the refrigerant mixture can be decreased to prevent a chain of disproportionation reactions. Preferably, the proportion of HFO-1123 in the refrigerant mixture used in the refrigerant circuit 11 during the operation of the refrigeration cycle apparatus 10 is not increased to prevent a chain of disproportionation reactions as compared with the proportion of HFO-1123 at the point in time when the refrigerant mixture is introduced into the refrigerant circuit. In this case, the refrigerating machine oil 60 is preferably configured as described below.

The refrigerating machine oil 60 according to Embodiment 7 is adapted to dissolve more HFO-1123 than the other refrigerant(s).

The refrigerating machine oil 60 used in Embodiment 7 is a polyol ester, for example. The polyol ester is produced by an esterification reaction between a fatty acid and a polyhydric alcohol (polyol). The solubility (the ease of dissolution) of the refrigerant in the polyol ester can be adjusted by changing the number of carbon atoms of the fatty acid, the molecular structure of the fatty acid (a fatty acid with a branched chain or a fatty acid with an unbranched chain (straight chain)), the number of carbon atoms of the polyhydric alcohol, and the molecular structure of the polyhydric alcohol (a polyhydric alcohol with a branched chain or a polyhydric alcohol with an unbranched chain (straight chain)).

The refrigerating machine oil 60 used in Embodiment 7 is not limited to the polyol ester and may be poly(vinyl ether) or poly(alkylene glycol). The poly(vinyl ether) includes an alkyl group bound via an ether bond to a side chain of a linear hydrocarbon. The solubility (the ease of dissolution) of a refrigerant in the poly(vinyl ether) can be adjusted by changing the component of the alkyl group bound via the ether bond to the side chain. The poly(alkylene glycol) includes a chain of propylene oxide and ethylene oxide bound via an ether bond. The solubility (the ease of dissolution) of a refrigerant in the poly(alkylene glycol) can be adjusted by changing the ratio of propylene oxide to ethylene oxide.

As a matter of course, at least two of the polyol ester, poly(vinyl ether), and poly(alkylene glycol) may be mixed to prepare the refrigerating machine oil 60.

Before introduced into the refrigerant circuit 11, the refrigerant mixture and the refrigerating machine oil 60 has a weight ratio in the range of 1 to 4.

As described above, the refrigeration cycle apparatus 10 includes the refrigerating machine oil 60 adapted to dissolve more HFO-1123 than the other refrigerant(s) contained in the refrigerant mixture. Thus, during the operation of the refrigeration cycle apparatus 10, the mixing ratio of HFO-1123 to the other refrigerant(s) in the refrigerant mixture circulating through the refrigerant circuit 11 is not higher than the mixing ratio at the point in time when the refrigerant mixture is introduced into the refrigerant circuit. Thus, even during the operation of the refrigeration cycle apparatus 10, a disproportionation reaction of HFO-1123 can be suppressed.

The use of R32 as the other refrigerant, that is, the use of a refrigerant mixture of HFO-1123 and R32 in the refrigeration cycle apparatus 10 can further suppress a disproportionation reaction of HFO-1123. This is because a refrigerant mixture of HFO-1123 and R32 is a near-azeotropic refrigerant and is rarely separated into HFO-1123 and R32, and a partial increase in the concentration of HFO-1123 due to separation of the refrigerant mixture circulating through the refrigerant circuit 11 can be suppressed.

The proportion of HFO-1123 in a refrigerant mixture of HFO-1123 and R32 is preferably 60% or less by weight before the refrigerant mixture is introduced into the refrigerant circuit 11. This is because a refrigerant with a lower temperature is more easily dissolved in the refrigerating machine oil 60. Since the refrigerant temperature is lower during heating than during cooling, more refrigerant is dissolved in the refrigerating machine oil 60 during heating than during cooling. The refrigerating machine oil 60 according to Embodiment 7 is adapted to dissolve more HFO-1123 than R32. Thus, when the proportion of HFO- 1123 in a refrigerant mixture of HFO-1123 and R32 is 60% or less by weight, the proportion of R32 in the refrigerant mixture circulating through the refrigerant circuit 11 during heating operation can be increased to improve the coefficient of performance (COP) of the refrigeration cycle apparatus 10. Considering the effect of reducing global warming potential (GWP) with HFO-1123, the proportion of HFO-1123 in the refrigerant mixture is preferably 10% or more by weight.

A refrigerant mixture and the refrigerating machine oil 60 are preferably introduced into the refrigerant circuit 11 such that the weight ratio of the refrigerant mixture to the refrigerating machine oil 60 ranges from 1 to 4. When a refrigerant mixture and the refrigerating machine oil 60 are introduced into the refrigerant circuit 11 such that the weight ratio of the refrigerant mixture to the refrigerating machine oil 60 is less than 1, such an excessively small ratio of the refrigerant mixture to the refrigerating machine oil 60 results in excessively large variations in the composition of the refrigerant mixture (variations in the ratio of HFO-1123 to another refrigerant) and variations in the composition of the refrigerant mixture, thus making it difficult to control the refrigeration cycle apparatus 10. On the other hand, when a refrigerant mixture and the refrigerating machine oil 60 are introduced into the refrigerant circuit 11 such that the weight ratio of the refrigerant mixture to the refrigerating machine oil 60 is more than 4, such an excessively large ratio of the refrigerant mixture to the refrigerating machine oil 60 results in small variations in the composition of the refrigerant mixture (variations in the ratio of HFO-1123 to another refrigerant) and a small COP improvement effect. When a refrigerant mixture and the refrigerating machine oil 60 are introduced into the refrigerant circuit 11 such that the weight ratio of the refrigerant mixture to the refrigerating machine oil 60 ranges from 1 to 4, the refrigeration cycle apparatus 10 can be stably controlled and have a sufficient COP improvement effect.

An example of the amount of refrigerant dissolved in the refrigerating machine oil 60 will be described below.

Figure 10:
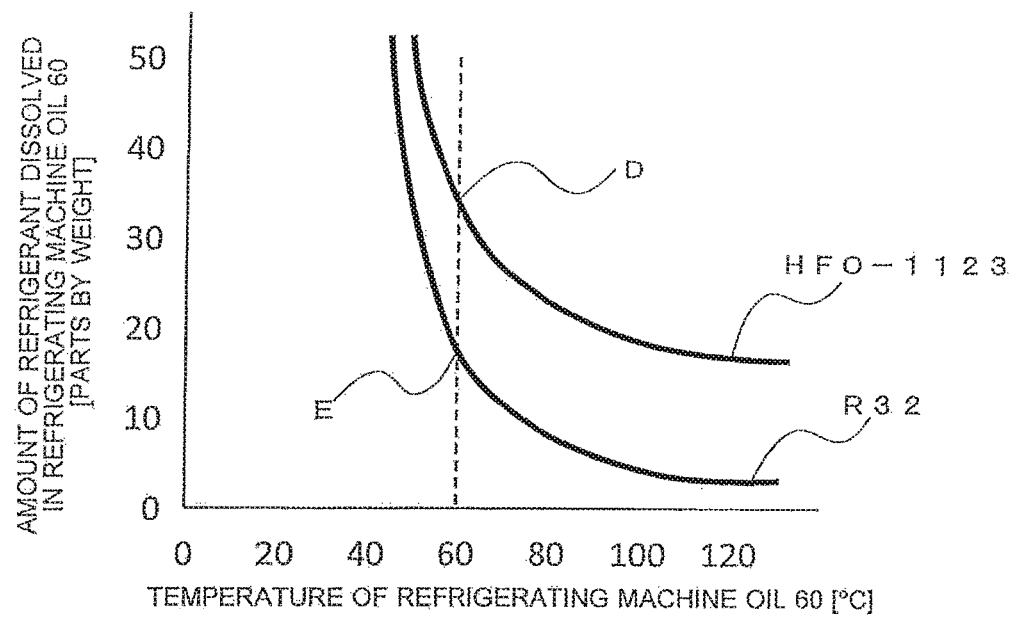
FIG. 10 is a graph of the amount of refrigerant dissolved in refrigerating machine oil 60 according to Embodiment 7 of the present invention.

FIG. 10 is a graph of the amount of refrigerant dissolved in a refrigerating machine oil 60 according to Embodiment 7 of the present invention. FIG. 10 illustrates the amounts of HFO-1123 and another refrigerant other than HFO-1123 of a refrigerant mixture dissolved in the refrigerating machine oil 60, and the other refrigerant is R32. The vertical axis in FIG. 10 represents the amounts of HFO-1123 and R32 dissolved in 100 parts by weight of the refrigerating machine oil 60.

FIG. 10 shows that the amount of HFO-1123 dissolved in the refrigerating machine oil 60 is greater than the amount of R32 dissolved in the refrigerating machine oil 60. The position at which the temperature of the refrigerating machine oil 60 is 60 degrees C. (the position of the broken line) in FIG. 10 indicates the operation of the refrigeration cycle apparatus 10 in which the refrigerant mixture has a dew point temperature of 40 degrees C. and the refrigerating machine oil 60 in the compressor 12 has a temperature of 60 degrees C. (in other words, the degree of superheat of discharge in the compressor 12 is 20 degrees C.). Under these operating conditions, the amount of dissolved HFO-1123 is 33 parts by weight (point D). The amount of dissolved R32 is 17 parts by weight (point E), which is smaller by 16 parts by weight than the amount of dissolved HFO-1123. The effects described above (in particular, the COP improvement effect) can be achieved by adjusting the refrigerating machine oil 60 to dissolve such amounts of refrigerants. Under the operating conditions, the effects described above (in particular, the COP improvement effect) can be achieved by adjusting the refrigerating machine oil 60 such that the amount of dissolved HFO-1123 is 30 parts by weight or more and the amount of dissolved R32 is smaller by at least 10 parts by weight than the amount of dissolved HFO-1123.

Embodiment 8

A refrigerant mixture according to Embodiment 8 is a mixture of HFO-1123, R32, and HFO-1234yf. In the refrigerant mixture before being introduced into the refrigerant circuit 11, HFO-1123 is less than 50% by weight, and the mixing ratio of R32 to HFO-1123 ranges from 0.7 to 2 by weight. When the mixing ratio of R32 to HFO-1123 ranges from 0.7 to 2 by weight, R32 and HFO-1123 constitute a near-azeotropic state (near-azeotropic refrigerant).

In the refrigerating machine oil 60 according to Embodiment 8, R32 is the most difficult to dissolve among HFO-1123, R32, and HFO-1234yf. The refrigerating machine oil 60 is also adapted to dissolve more HFO-1234yf than HFO-1123.

The refrigerating machine oil 60 used in Embodiment 8 is a polyol ester, for example. The polyol ester is produced by an esterification reaction between a fatty acid and a polyhydric alcohol (polyol). The solubility (the ease of dissolution) of the refrigerant in the polyol ester can be adjusted by changing the number of carbon atoms of the fatty acid, the molecular structure of the fatty acid (a fatty acid with a branched chain or a fatty acid with an unbranched chain (straight chain)), the number of carbon atoms of the polyhydric alcohol, and the molecular structure of the polyhydric alcohol (a polyhydric alcohol with a branched chain or a polyhydric alcohol with an unbranched chain (straight chain)).

The refrigerating machine oil 60 used in Embodiment 8 is not limited to the polyol ester and may be poly(vinyl ether) or poly(alkylene glycol). The poly(vinyl ether) includes an alkyl group bound via an ether bond to a side chain of a linear hydrocarbon. The solubility (the ease of dissolution) of a refrigerant in the poly(vinyl ether) can be adjusted by changing the component of the alkyl group bound via the ether bond to the side chain. The poly(alkylene glycol) includes a chain of propylene oxide and ethylene oxide bound via an ether bond. The solubility (the ease of dissolution) of a refrigerant in the poly(alkylene glycol) can be adjusted by changing the ratio of propylene oxide to ethylene oxide.

As a matter of course, at least two of the polyol ester, poly(vinyl ether), and poly(alkylene glycol) may be mixed to prepare the refrigerating machine oil 60.

Before introduced into the refrigerant circuit 11, the refrigerant mixture and the refrigerating machine oil 60 has a weight ratio in the range of 1 to 4.

In the refrigeration cycle apparatus 10, as described above, the refrigerant mixture before being introduced into the refrigerant circuit 11 contains less than 50% by weight of HFO-1123 to reduce the amount of HFO-1123 in the refrigerant circuit 11. The refrigeration cycle apparatus 10 can suppress a disproportionation reaction of HFO-1123. In the refrigeration cycle apparatus 10, R32 is the most difficult to dissolve in the refrigerating machine oil 60. Thus, the proportion of HFO-1123 in the refrigerant mixture cannot be increased even during the operation of the refrigeration cycle apparatus 10. Thus, even during the operation of the refrigeration cycle apparatus 10, a disproportionation reaction of HFO-1123 can be suppressed. In the refrigerant mixture used in the refrigeration cycle apparatus 10, the mixing ratio of R32 to HFO-1123 ranges from 0.7 to 2 by weight. Thus, HFO-1123 and R32 can constitute a near-azeotropic state. In the refrigeration cycle apparatus 10, therefore, HFO-1123 is rarely separated from R32 and rarely undergoes a disproportionation reaction. Thus, the refrigeration cycle apparatus 10 can prevent explosion due to a chain of disproportionation reactions of HFO-1123 and has a high degree of safety even using HFO-1123.

Considering the effect of reducing global warming potential (GWP) with HFO-1123, the proportion of HFO-1123 in the refrigerant mixture is preferably 10% or more by weight.

In the refrigeration cycle apparatus 10, HFO-1234yf as well as R32 is mixed to decrease the proportion of HFO-1123 in the refrigerant mixture. This can also reduce the GWP of the refrigerant mixture.

An example of the component ratio of the refrigerant mixture and an example of the amount of refrigerant dissolved in the refrigerating machine oil 60 will be described below.

Figure 11:
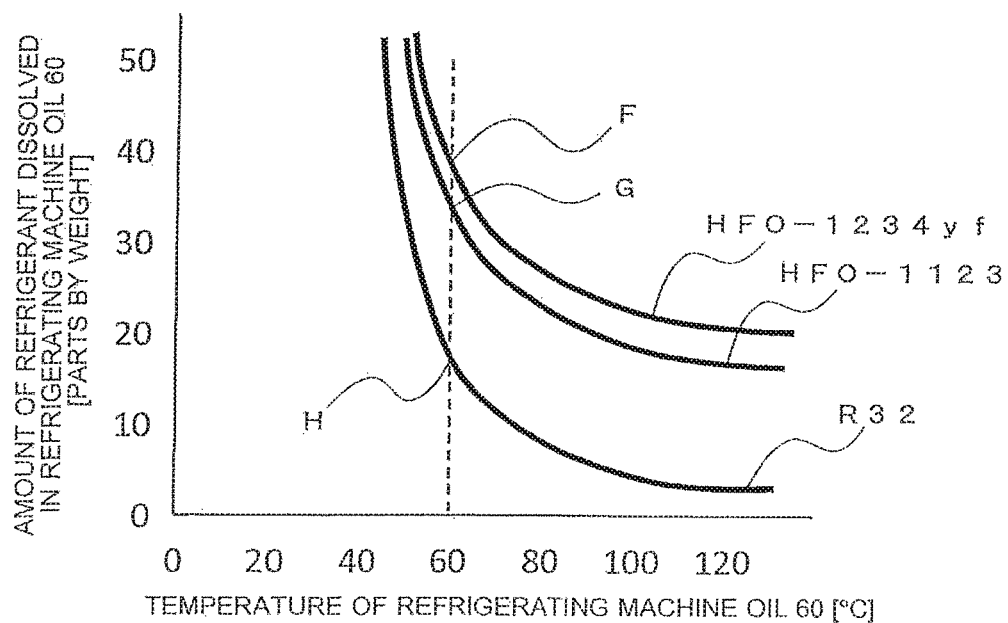
FIG. 11 is a graph of the amount of refrigerant dissolved in a refrigerating machine oil 60 according to Embodiment 8 of the present invention.
Figure 12:
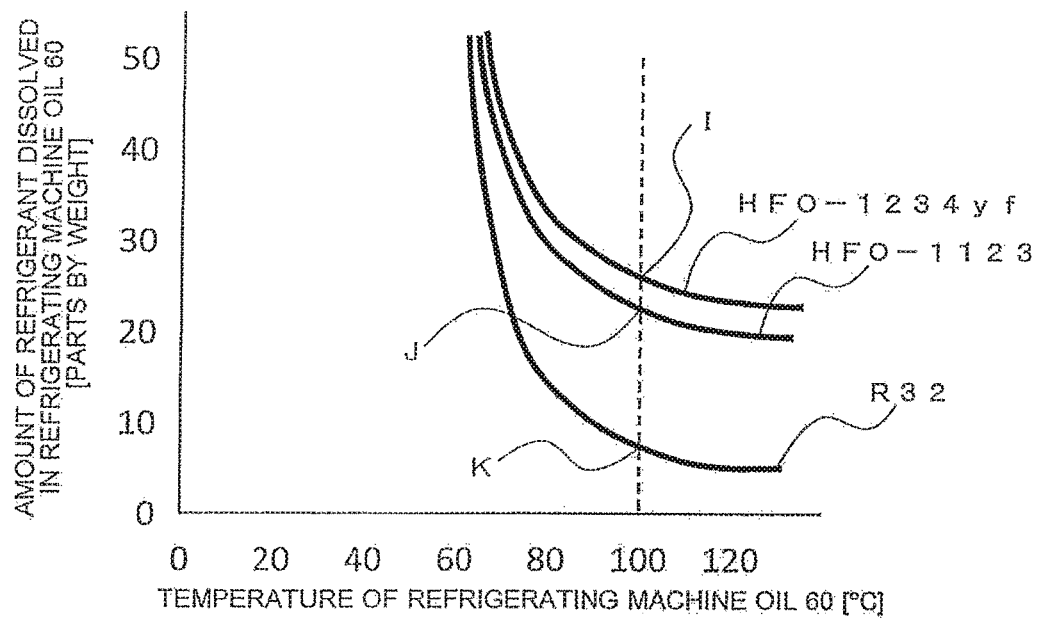
FIG. 12 is a graph of the amount of refrigerant dissolved in the refrigerating machine oil 60 according to Embodiment 8 of the present invention.

FIGS. 11 and 12 are graphs of the amount of refrigerant dissolved in the refrigerating machine oil 60 according to Embodiment 8 of the present invention. FIG. 11 shows the amount of dissolved refrigerant in normal operation. FIG. 12 shows the amount of dissolved refrigerant in overload operation. In FIGS. 11 and 12, the refrigerant mixture before being introduced into the refrigerant circuit has a composition of HFO-1123:R32:HFO-1234yf=40:40:20 by weight. The vertical axis in FIGS. 11 and 12 represents the amounts of HFO-1123 and R32 dissolved in 100 parts by weight of the refrigerating machine oil 60.

FIGS. 11 and 12 show that the amount of each refrigerant (refrigerants constituting the refrigerant mixture) dissolved in the refrigerating machine oil 60 is HFO-1234yf>HFO-1123>R32. The state in which the temperature of the refrigerating machine oil 60 in normal operation is 60 degrees C. (the position of the broken line in FIG. 11) indicates the operation of the refrigeration cycle apparatus 10 in which the refrigerant mixture has a dew point temperature of 40 degrees C. and the refrigerating machine oil 60 in the compressor 12 has a temperature of 60 degrees C. (in other words, the degree of superheat of discharge in the compressor 12 is 20 degrees C.). Under these operating conditions, the amount of dissolved HFO-1234yf is 38 parts by weight (point F). The amount of dissolved HFO-1123 is 33 parts by weight (point G). The amount of dissolved R32 is 17 parts by weight (point H), which is smaller by 21 parts by weight than the amount of dissolved HFO-1234yf.

Adjusting the amount of each refrigerant (refrigerants constituting the refrigerant mixture) dissolved in the refrigerating machine oil 60 to be HFO-1234yf>HFO-1123>R32 can decrease the proportion of HFO-1234yf in the refrigerant mixture circulating through the refrigerant circuit 11. This can increase the pressure of the refrigerant mixture and decrease the temperature glide of the refrigerant mixture during condensation and evaporation, thereby improving the performance (COP) of the refrigeration cycle apparatus 10.

By adjusting the amount of each refrigerant (refrigerants constituting the refrigerant mixture) dissolved in the refrigerating machine oil 60 to be HFO-1234yf>HFO-1123>R32, the proportion of HFO-1234yf in the refrigerant mixture circulating through the refrigerant circuit 11 during the operation of the refrigeration cycle apparatus 10 is not higher than the proportion of HFO-1234yf at the point in time when the refrigerant mixture is introduced into the refrigerant circuit 11. Thus, the performance of the refrigeration cycle apparatus 10 does not deteriorate.

The state in which the temperature of the refrigerating machine oil 60 in overload operation is 100 degrees C. (the position of the broken line in FIG. 12) indicates the operation of the refrigeration cycle apparatus 10 in which the refrigerant mixture has a dew point temperature of 60 degrees C. and the refrigerating machine oil 60 in the compressor 12 has a temperature of 100 degrees C. (in other words, the degree of superheat of discharge in the compressor 12 is 40 degrees C.). Under these operating conditions, the amount of dissolved HFO-1234yf is 26 parts by weight (point I). The amount of dissolved HFO-1123 is 22 parts by weight (point J). The amount of dissolved R32 is 7 parts by weight (point K), which is smaller by 19 parts by weight than the amount of dissolved HFO-1234yf.

A refrigerant with a higher refrigerant temperature is more difficult to dissolve in the refrigerating machine oil 60. Since the refrigerant temperature is higher in overload operation than in normal operation, less refrigerant is dissolved in the refrigerating machine oil 60 in overload operation than in normal operation. Thus, the proportion of HFO-1234yf in the refrigerant mixture circulating through the refrigerant circuit 11 is higher in overload operation than in normal operation. Because HFO-1234yf has a low operating pressure, adjusting the amount of each refrigerant (refrigerants constituting the refrigerant mixture) dissolved in the refrigerating machine oil 60 to be HFO-1234yf>HFO-1123>R32 can also be effective in decreasing the refrigerant pressure on the high-pressure side in overload operation.

Figure 13:
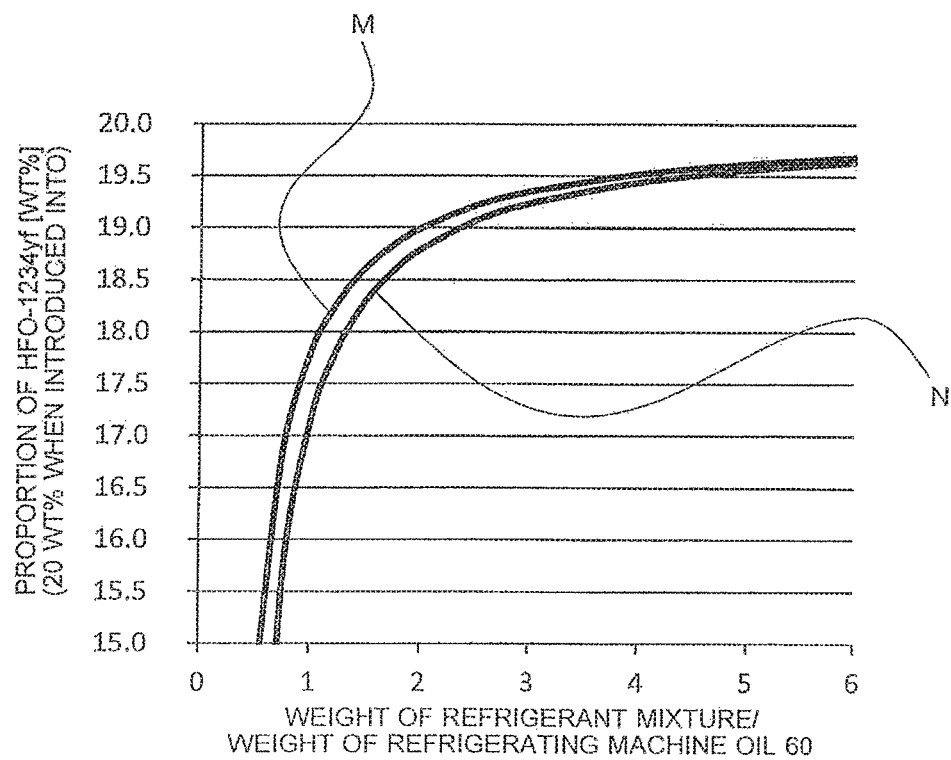
FIG. 13 is a graph of the component ratio of HFO-1234yf in the case where each refrigerant of the refrigerant mixture is dissolved in the refrigerating machine oil 60 at a ratio shown in FIGS. 11 and 12.

FIG. 13 is a graph of the component ratio of HFO-1234yf in the case where each refrigerant of the refrigerant mixture is dissolved in the refrigerating machine oil 60 at a ratio shown in FIGS. 11 and 12. The horizontal axis in FIG. 13 represents the weight ratio of the refrigerant mixture before being introduced into the refrigerant circuit 11 to the refrigerating machine oil 60 (the weight of the refrigerant mixture/the weight of the refrigerating machine oil 60). The vertical axis in FIG. 13 represents the proportion of HFO-1234yf in the refrigerant mixture circulating through the refrigerant circuit 11. The curved line N represents the component ratio of HFO-1234yf in normal operation, and the curved line M represents the component ratio of HFO-1234yf in overload operation.

When the refrigerant mixture and the refrigerating machine oil 60 are introduced into the refrigerant circuit 11 such that the weight ratio of the refrigerant mixture to the refrigerating machine oil 60 is less than 1, such an excessively small ratio of the refrigerant mixture to the refrigerating machine oil 60 results in excessively large variations in the composition of the refrigerant mixture and variations in the composition of the refrigerant mixture, thus making it difficult to control the refrigeration cycle apparatus 10. When the refrigerant mixture and the refrigerating machine oil 60 are introduced into the refrigerant circuit 11 such that the weight ratio of the refrigerant mixture to the refrigerating machine oil 60 is more than 4, such an excessively large ratio of the refrigerant mixture to the refrigerating machine oil 60 results in a variation in the proportion of HFO-1234yf as small as less than 0.5% by weight. This reduces the COP improvement effect and the effect of reducing high pressure. Since the refrigerant mixture and the refrigerating machine oil 60 are introduced into the refrigerant circuit 11 such that the weight ratio of the refrigerant mixture to the refrigerating machine oil 60 ranges from 1 to 4 in Embodiment 8, the refrigeration cycle apparatus 10 can be stably controlled and have a sufficient COP improvement effect and a sufficient effect of reducing high pressure.

The composition of the refrigerant mixture before being introduced into the refrigerant circuit (HFO-1123:R32:HFO-1234yf=40:40:20) is only an example. However, an excessively increased proportion of HFO-1234yf may result in poor performance of the refrigeration cycle apparatus 10 due to increased pressure loss. Thus, the proportion of HFO-1234yf is preferably 50% or less by weight.

The amount of each dissolved refrigerant shown in FIGS. 11 and 12 is also only an example. Under the operating conditions where the dew point temperature is 40 degrees C. and the refrigerating machine oil 60 in the compressor 12 has a temperature of 60 degrees C., the effects described above can be achieved by adjusting the refrigerating machine oil 60 such that the amount of dissolved HFO-1234yf is 30 parts by weight or more and the amount of dissolved R32 is smaller by at least 10 parts by weight than the amount of dissolved HFO-1234yf.

The invention claimed is:

1. A refrigeration cycle apparatus comprising:
   a refrigerant circuit including a compressor, an outdoor heat exchanger being configured to serve as a condenser during cooling, and an expansion mechanism, the outdoor heat exchanger and the expansion mechanism being connected by at least one pipe, the compressor including a first member and a second member, the first member formed of a base metal, the base metal being steel, the first member including a first contact portion, the second member including a second contact portion configured to be in contact with the first contact portion of the first member in a slidable manner;
   a refrigerant mixture inclusive of 1,1,2-trifluoroethylene and used in the refrigerant circuit; and
   a refrigerating machine oil that is free of phosphoric ester in the refrigerant circuit, and includes 2% or more by weight of an acid scavenger,
   wherein the base metal of the first member of the compressor is exposed at the first contact portion of the first member,
   the outdoor heat exchanger includes a refrigerant flow path configured such that the refrigerant mixture flows through the refrigerant flow path,
   an expanded pipe portion is one of the at least one pipe, the expanded pipe portion starts at an outlet of the outdoor heat exchanger configured to serve as the condenser, ends at an inlet of the expansion mechanism, and extends an entire length of the at least one pipe between the outlet and the inlet, the expanded pipe portion having a greater flow path cross-section from the outlet of the outdoor heat exchanger to the inlet of the expansion mechanism, than a first refrigerant flow path, the first refrigerant flow path being defined as a portion from an inlet of the refrigerant flow path of the refrigerant mixture to 50% of a total length of the refrigerant flow path, the at least one pipe being included in a second refrigerant flow path, the second refrigerant flow path being defined as a portion of the refrigerant flow path downstream of the first refrigerant flow path in a refrigerant mixture flow direction, and
   the expanded pipe portion is disposed downstream of the first refrigerant flow path of the outdoor heat exchanger configured to serve as the condenser.

2. The refrigeration cycle apparatus of claim 1, wherein the acid scavenger is an epoxy compound.

3. The refrigeration cycle apparatus of claim 1, wherein no anti-wear agent is added to included in the refrigerating machine oil.

4. The refrigeration cycle apparatus of claim 1, wherein the compressor includes
   a cylinder including a compression chamber,
   a rolling piston rotating in the compression chamber, and
   a vane separating the compression chamber into a low-pressure space and a high-pressure space, the vane having one edge being in contact with an outer peripheral surface of the rolling piston,
   wherein
   the first member is both of the rolling piston and the vane and the second member is the cylinder, or
   the first member is one of the rolling piston and the vane and the second member is the cylinder and another of the rolling piston and the vane.

5. The refrigeration cycle apparatus of claim 1, wherein the refrigerating machine oil has a saturated water content of 0.1% or more by weight.

6. The refrigeration cycle apparatus of claim 1, wherein the refrigerant circuit includes a dryer for trapping water.

7. The refrigeration cycle apparatus of claim 1, further comprising a filter on a pipe between the condenser and the expansion mechanism.

8. The refrigeration cycle apparatus of claim 1, wherein the expansion mechanism is a needle expansion mechanism with a variable opening degree.

9. The refrigeration cycle apparatus of claim 1, wherein the expansion mechanism includes two expansion mechanisms,
   the expansion mechanisms are disposed in series, and
   a filter is disposed between the expansion mechanisms.

* * * * *